(12) United States Patent
Davis et al.

(10) Patent No.: US 8,297,274 B2
(45) Date of Patent: Oct. 30, 2012

(54) SOLAR COLLECTOR

(75) Inventors: Patrick Robert Davis, Newcastle (GB); Boris Bauer, Bangor (GB); Richard Pelan, Portavogle (GB); Paul Thomas McEntee, Belfast (GB)

(73) Assignee: Kingspan Holdings (IRL) Limited, Kingscourt, County Cavan (IE)

( * ) Notice: Subject to any disclaimer, the term of this patent is extended or adjusted under 35 U.S.C. 154(b) by 108 days.

(21) Appl. No.: 12/451,414

(22) PCT Filed: May 30, 2008

(86) PCT No.: PCT/IE2008/000061
§ 371 (c)(1),
(2), (4) Date: Nov. 12, 2009

(87) PCT Pub. No.: WO2008/146269
PCT Pub. Date: Dec. 4, 2008

(65) Prior Publication Data
US 2010/0108055 A1    May 6, 2010

(30) Foreign Application Priority Data
May 30, 2007    (GB) .................................. 0710237.9

(51) Int. Cl.
*F24J 2/24*    (2006.01)
(52) U.S. Cl. ......... 126/663; 126/655; 126/670; 126/672
(58) Field of Classification Search .................. 126/663, 126/655, 670, 672; 165/142, 143, 144
See application file for complete search history.

(56) References Cited

U.S. PATENT DOCUMENTS

| 4,033,327 A | 7/1977 | Pei |
| 7,107,984 B2 * | 9/2006 | Haas et al. ..................... 126/652 |
| 2003/0209281 A1 | 11/2003 | Haas et al. |

FOREIGN PATENT DOCUMENTS

| DE | 4308626 | 8/1994 |
| DE | 298 19 819 | 1/1999 |
| DE | 202 16 789 | 1/2003 |
| DE | 102 50 744 | 5/2004 |
| DE | 103 56 163 | 7/2005 |
| DE | 20 2007 003 441 | 4/2008 |
| GB | 2 103 350 | 2/1983 |
| GB | 2 385 910 | 9/2003 |
| WO | WO 2004/111549 | 12/2004 |

OTHER PUBLICATIONS

British Search Report dated Jul. 15, 2008.
International Search Report dated Sep. 17, 2008.

* cited by examiner

*Primary Examiner* — Alfred Basichas
(74) *Attorney, Agent, or Firm* — Jacobson Holman PLLC

(57) ABSTRACT

A solar collector includes a solar absorbing tube containing an elongate tube that extends out of one end of the solar absorbing tube and into an end fitting. An annular outer passageway of the elongate tube communicates with a cold fluid inlet conduit within the end fitting. An inner passageway of the elongate tube communicates with a hot water outlet conduit within the end fitting. Each end fitting 15 is provided with a receiving portion extending orthogonally to the tubular passage for receiving an end of the concentric elongated tube. The end fittings are interconnected to provide fluid flow paths without the need for a manifold. Any number of solar collector tubes can be interconnected in this way.

26 Claims, 29 Drawing Sheets

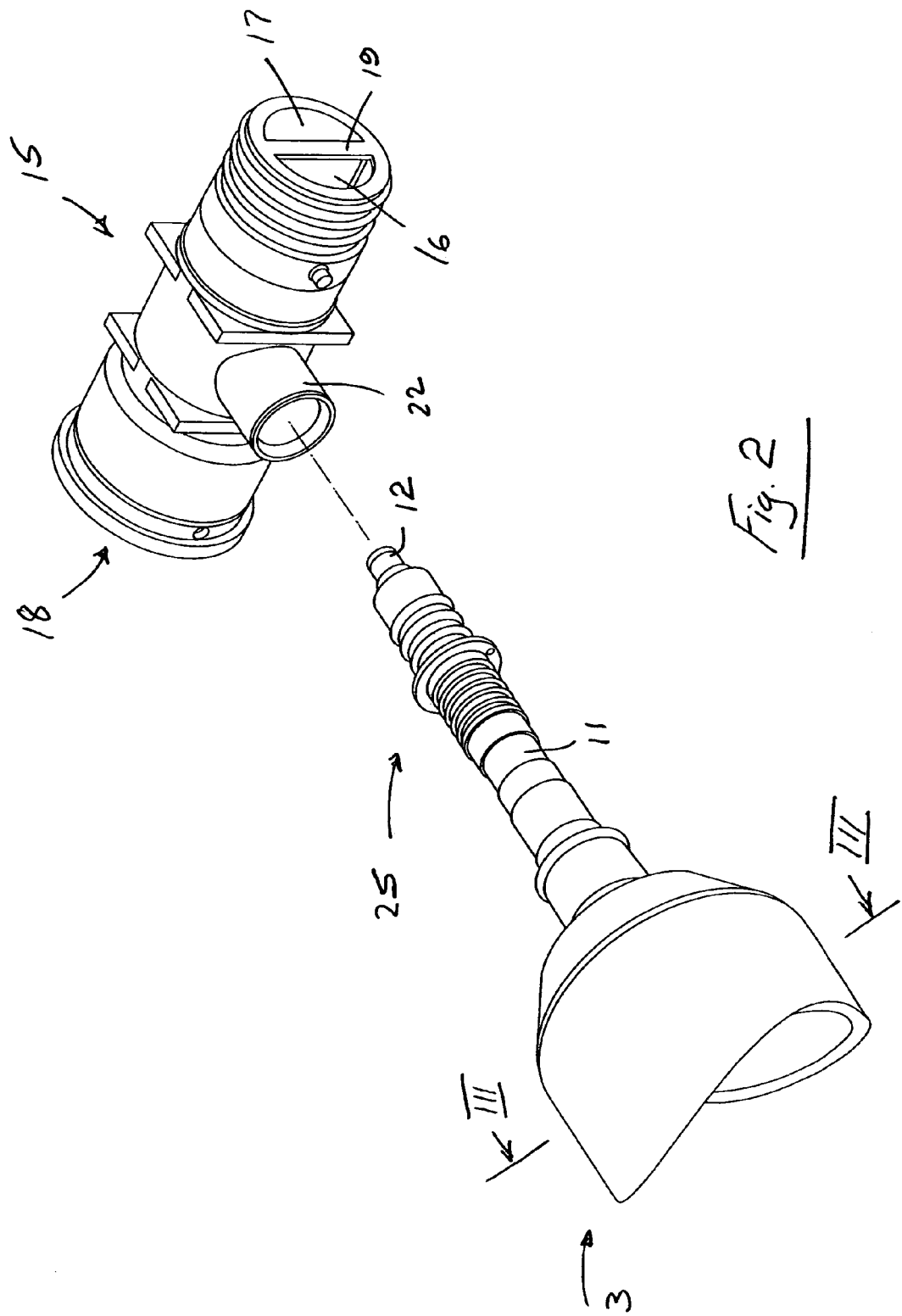

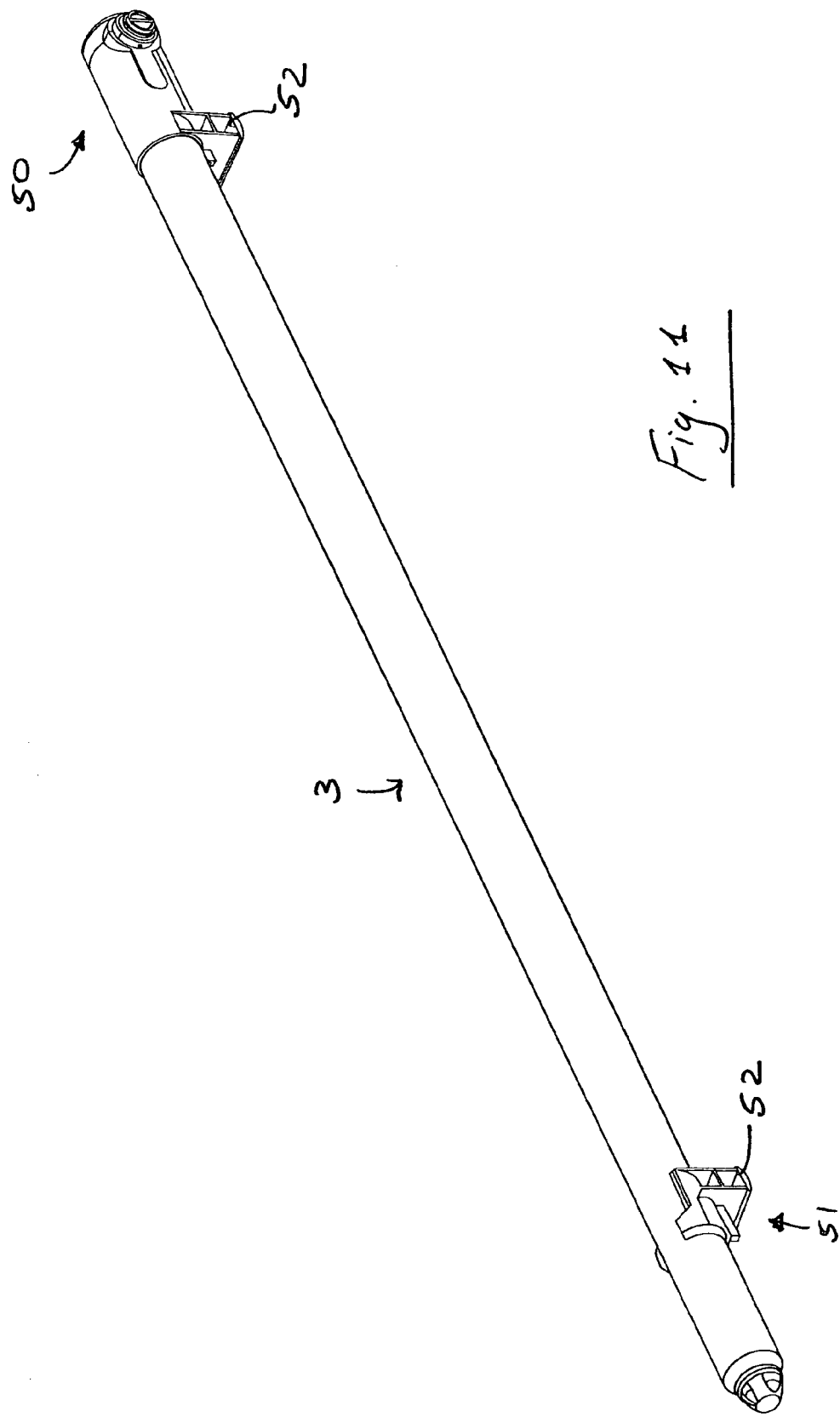

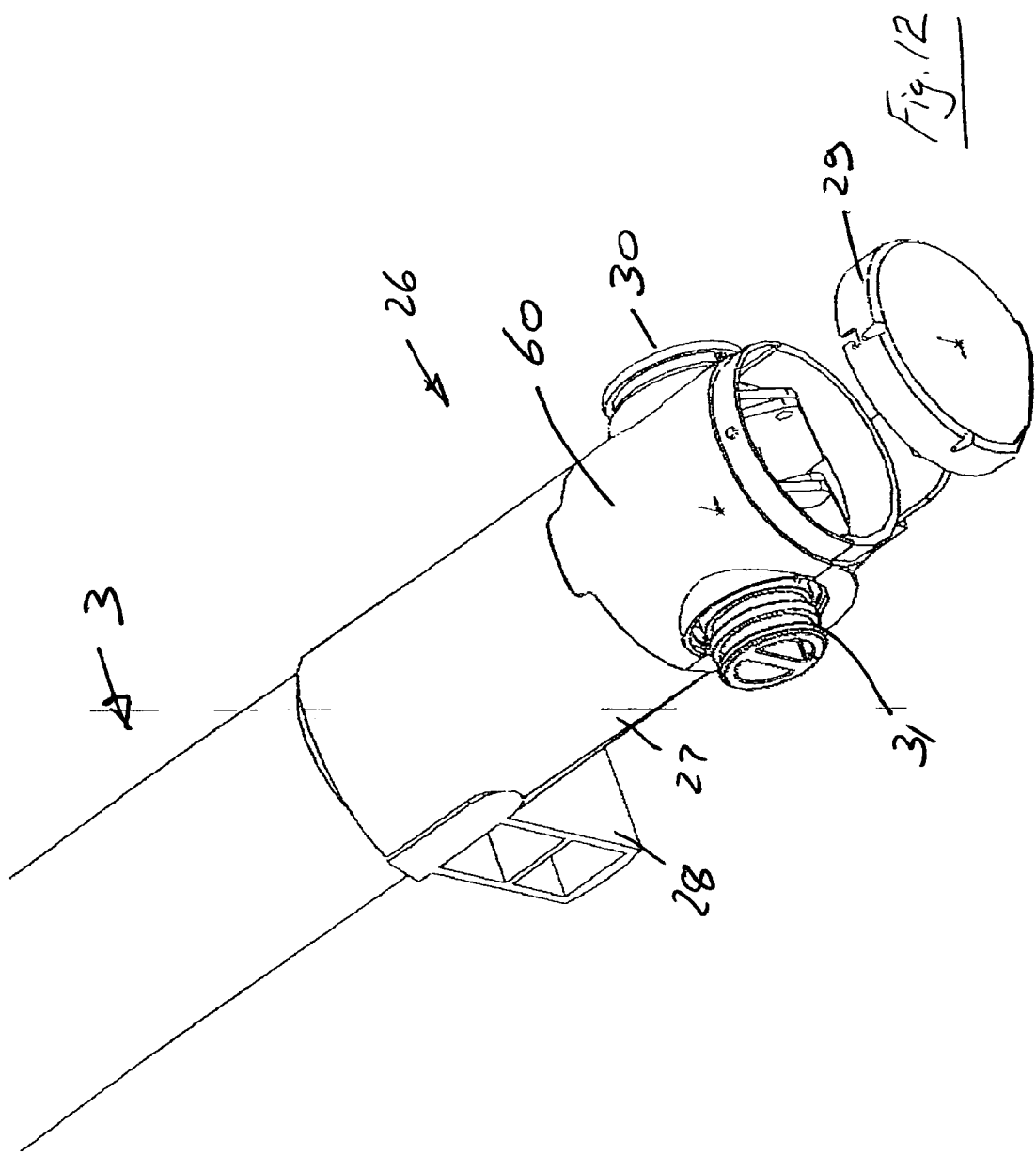

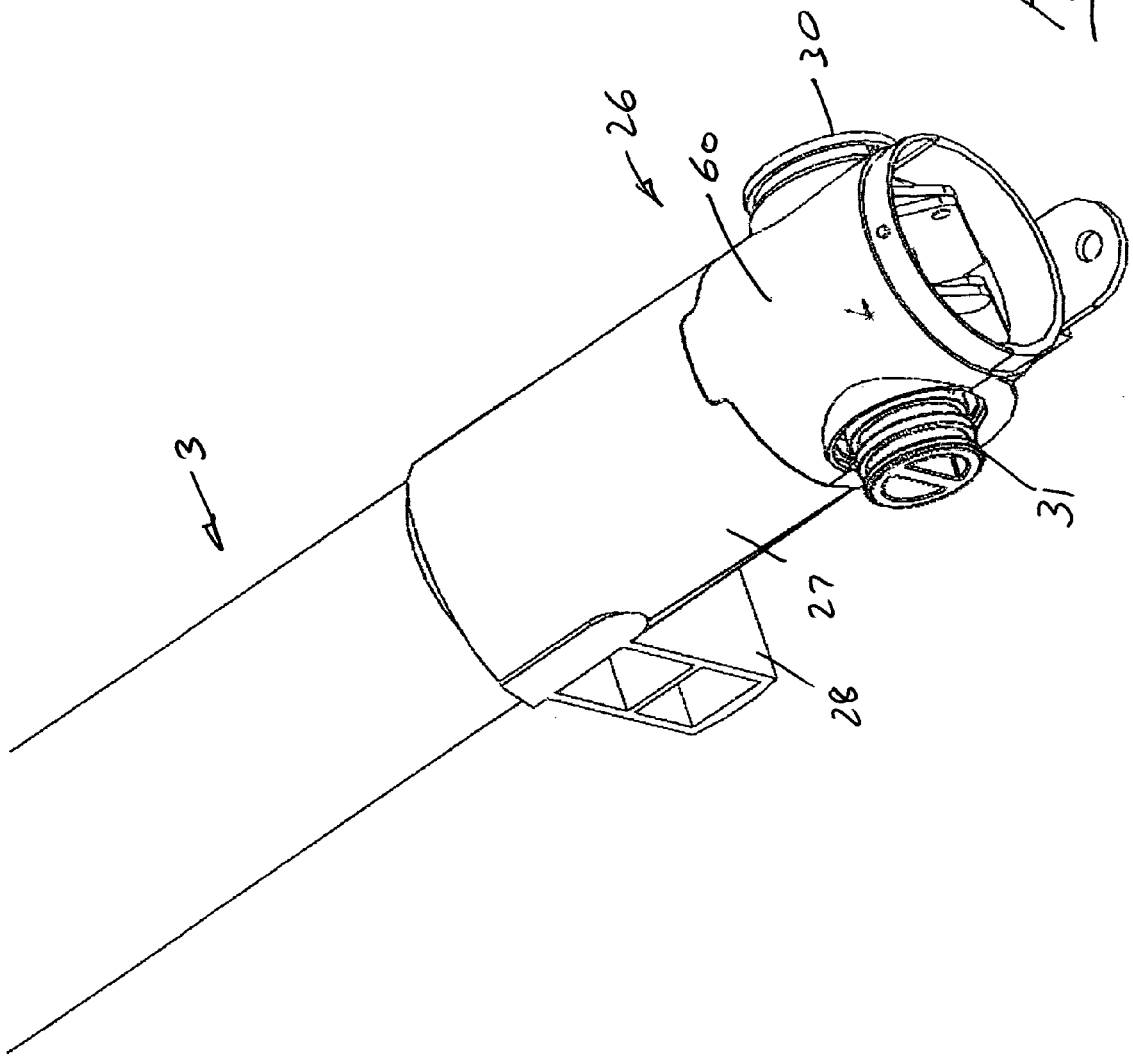

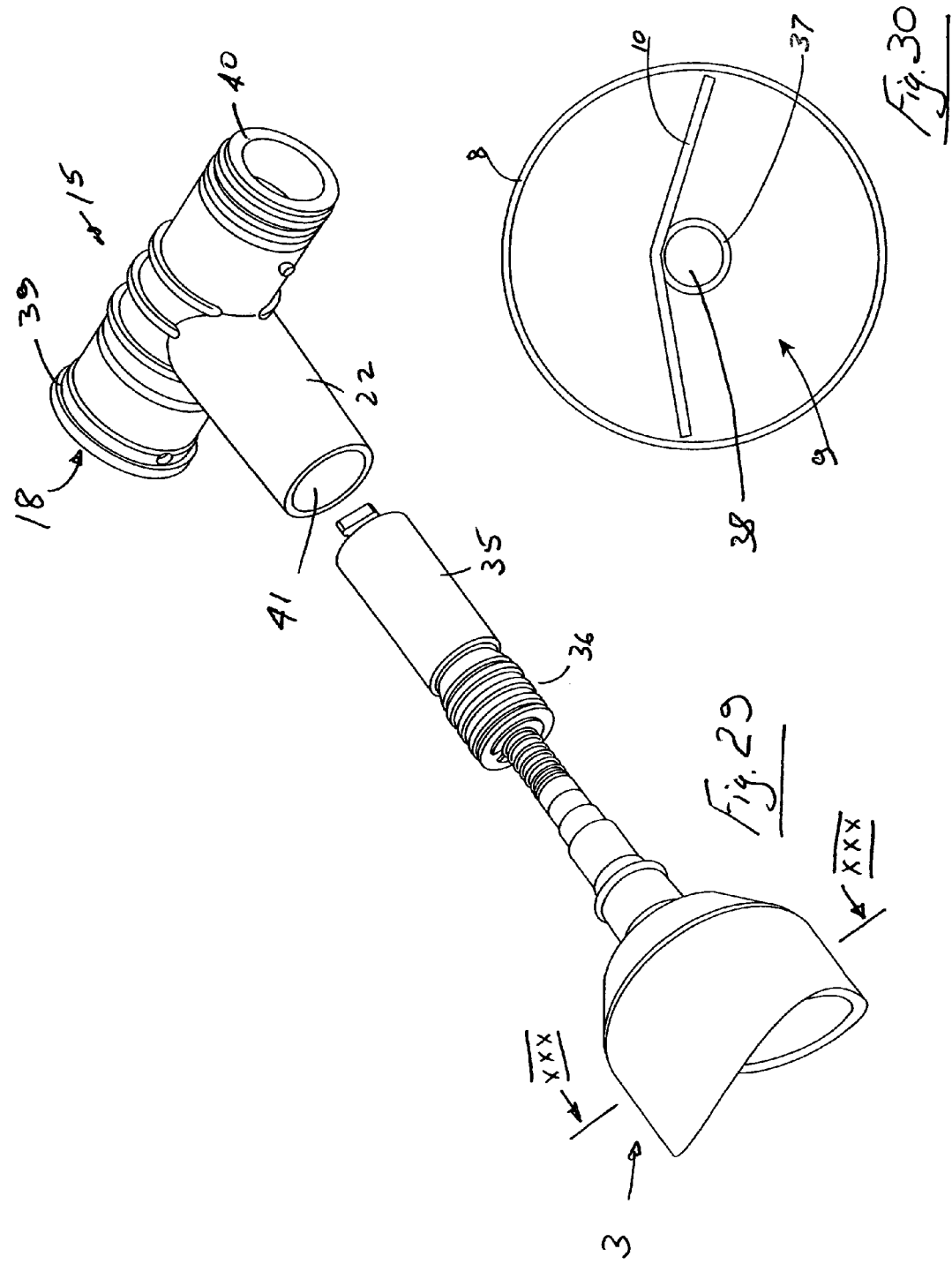

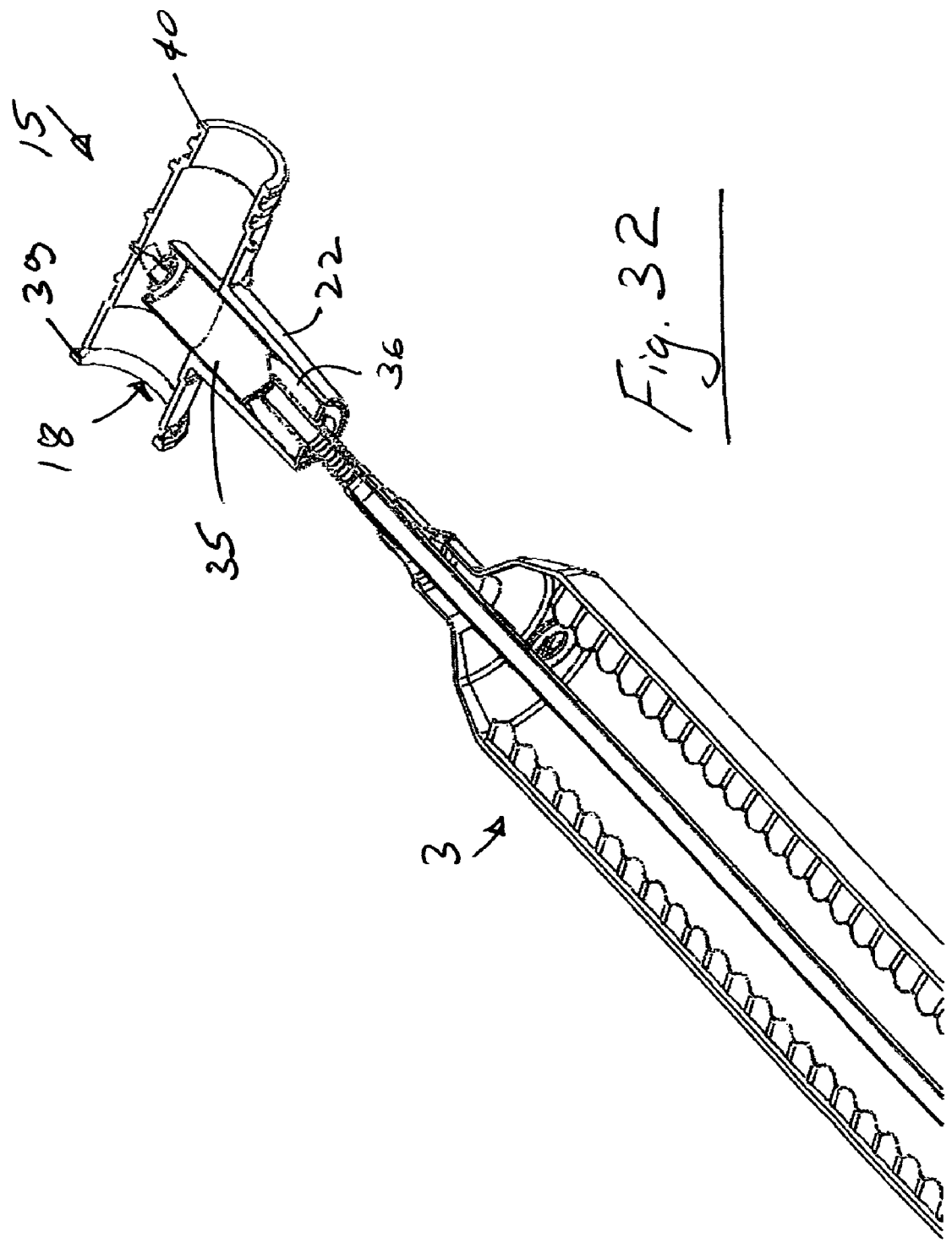

SOLAR COLLECTOR

This is a national stage of PCT/IE08/000,061 filed May 30, 2008 and published in English, which has a priority of United Kingdom no. 0710237.9 filed May 30, 2007, hereby incorporated by reference.

INTRODUCTION

The invention relates to a solar collector for converting solar radiation into heat and to transfer the latter with the maximum possible efficiency to a fluid heat transferring means (e.g. water or air) whereby the heat can be utilised in a domestic or industrial application, for example to heat a domestic hot water or central heating system.

A solar collector typically comprises a number of elongate tubes containing a radiation absorbing plate for absorbing solar radiation in contact with a pipe through which the fluid to be heated can be passed or within which is contained a working fluid for transferring heat to the fluid to be heated. The radiation absorbing plate and at least a portion of the pipe are enclosed within an evacuated radiation transparent enclosure to prevent heat loss.

In one type of solar collector, known as the direct flow type, the fluid to be heated flows through the pipe in contact with the plate for direct conduction of heat between the plate and the fluid.

In an alternative type of solar collector, known as the heat pipe type, the pipe forms a closed chamber and contains a working fluid, the pipe defining an evaporator section, in thermal contact with said radiation absorbing plate, and a condenser section remote from said plate, said plate and said evaporator section of said elongate tube being enclosed within the evacuated radiation transparent enclosure to prevent heat loss. The condenser section is placed in thermal contact with the fluid to be heated to allow heat transfer between the working fluid and the fluid to be heated.

The heat pipe type of collector utilises the phase change of the working fluid to achieve greater efficiency. The energy which is required for the flow of the working fluid is provided by gravity so that no external pumping source is necessary. A known heat pipe type solar collector is disclosed in GB2103350.

Both types of solar collector further comprise a heat collection manifold containing a fluid to be heated and having at least one solar tube receiving aperture therein for insertion of on end of each elongate tube to enable the fluid to be heated to pass into and out of the pipe of each elongate tube, in the case of the direct flow type, or to permit heat transfer between the working fluid within the condenser section of the pipe and the fluid to be heated in the case of the heat pipe type. The manifold is typically provided with inlet and outlet connections.

The separate elongate tubes and the heat collection manifold of the solar collector need to be capable of being readily assembled on site and designed so that they are capable of taking up the tolerances which are usual in this field of the technology without risk of damage or leakages. In addition, it is necessary that these component parts be easily replaceable. To date the traditional solar collector manifold has typically had a fixed number of receiving apertures as shown in FIG. 1. A traditional solar collector 1 comprises a manifold housing 2, a plurality of elongate tubes 3 and a support structure 4. The manifold is typically provided with an inlet port 5 and an outlet port 6 to allow the flow of the fluid to be heated. A plurality of inlet apertures 7 is also provided to allow the insertion of the elongate tubes 3 into the manifold 2. The restrictive design of such traditional solar thermal collectors has limited the flexibility of the solar collector for various applications. Significant redesign of the heat collection manifold 2 is typically required in order to provide systems of variable size and energy generating capability. Traditional manifolds are fixed in their dimensions and the number of solar tubes that they can accommodate.

The present invention aims to address the limitations of current collector design by providing a solution that is sufficiently flexible to allow a collector to be constructed with any number of solar tubes and the size of which is not limited to the design and construction of the manifold.

The benefits of such an approach mean that the collector can be more accurately sized for its specific application or to fit confined or unusual spaces.

An additional aim of the present invention is to provide a solar collector having a high efficiency and which can be constructed cheaply, and can readily be assembled and overhauled, using less components than prior art devices.

STATEMENTS OF INVENTION

According to the invention there is provided a solar collector comprising at least one elongate tube, said at least one elongate tube including means for absorbing solar radiation, means for transferring heat from said heat absorbing means to a fluid to be heated and an end fitting providing fluid connection means for connecting with a corresponding end fitting of an adjacent elongate member to permit passage of fluid between the end fittings without requiring a separate manifold.

In one embodiment said end fitting is provided at one end of each elongate member.

In one case the end fitting comprises a fluid passageway, the end fitting being adapted to sealingly engage a similar passageway of an adjacent end fitting.

Preferably the end fitting comprises a seal for sealing engaging the passageways of adjacent end fittings. The end fitting may comprise a groove or recess for receiving an O-ring seal.

In one embodiment the end fitting comprises a receiving portion for receiving an end of a fluid flow pipe of a solar collector tube or a condenser section of a solar collector tube. The receiving portion may extend substantially orthogonally to the fluid passageway.

In one case the receiving section is adapted for sealingly engaging with an end of a fluid flow pipe or a condenser section of a solar collector tube.

The receiving section may comprise a smooth face for engaging a seal or a seal for sealing engaging with an end of a fluid flow pipe of a solar collector tube. The seal may comprise an O-ring. The receiving section may be adapted for sealing engagement with a sealing plug of a condenser section of a solar collector tube.

In one embodiment the passageway is divided by a longitudinally extending dividing wall into a cold fluid passageway for a cold fluid stream and a hot fluid passageway for a hot fluid stream.

In one case the dividing wall comprises an opening through which a hot fluid pipe of the solar collector tube extends for delivery of hot fluid from the solar collector tube into the hot fluid passageway.

The cold fluid passageway is preferably in fluid communication with a cold fluid pipe of the solar collector tube.

In a preferred embodiment, on assembly of one end fitting to an adjacent similar end fitting, the dividing walls of the end fittings are substantially contiguous.

In one embodiment the solar collector comprises a protective casing for receiving the end fitting and an end of the solar collector tube. The end fitting and/or the end of the solar collector tube are preferably releasably engageable in the protective casing.

In one case the protective casing comprises a main protector body and a closure part which is movably mounted to or removable from the main protector body.

The protective casing may comprise a removable end cap. Preferably the protective casing comprises a hinged or pivotal lid part.

In one embodiment the protective casing comprises a receiver for receiving a locking clip for securely mounting the solar collector tube and/or the associated end fitting in the protective housing.

The protective casing may comprise a support structure. The support structure may be integral with the protective housing.

In one case the support structures of adjacent protective casings are interlinkable. Adjacent support structures may be interlocked by an interlink component. At least part of the interlink component may be integral with the support structure. The interlink component may be separate or separable from the support structure.

The invention also provides a solar collector assembly comprising a plurality of similar solar collectors as claimed in any preceding claim.

According to the invention there is provided a solar collector comprising at least one elongate tube, said at least one elongate tube including means for absorbing solar radiation, means for transferring heat from said heat absorbing means to a fluid to be heated and fluid connection means for connection with corresponding fluid connection means of an adjacent elongate member and/or to an inlet or outlet conduit to permit passage of said fluid to be heated between adjacent elongate members without requiring a separate manifold.

Preferably said connection means is provided at one or both ends of each elongate member.

Preferably each elongate member includes connection means to enable the elongate member to be connected to a supporting structure.

Preferably each fluid connection means preferably includes one or more seal means, such as an o-ring or a compression fitting.

Preferably said absorbing means of each elongate tube comprises a radiation absorbing surface, such as a plate, enclosed within an evacuated radiation transparent enclosure formed from a radiation transparent material, such as glass.

Preferably the fluid connection means is formed on an end fitting provided on one or both ends of the evacuated tube of each elongate tube. Preferably said supporting structure connecting means are provided on each end fitting. In one embodiment said supporting structure connecting means comprises one or more channel sections arranged transverse to the longitudinal axis of each elongate tube.

In a preferred embodiment, the fluid connection means comprises a tubular opening adapted to sealingly engage a similar tubular opening on an adjacent elongate tube. Preferably said tubular opening includes a central dividing wall to divide said opening into an inlet and an outlet port. An o-ring seal may be provided between the tubular openings of adjacent elongate tubes to prevent fluid leakage.

In one embodiment, said radiation absorbing surface of each elongate member is in thermal contact with an elongate tube having at least one internal flow passageway for the flow of said fluid to be heated, said at least one internal flow passageway communicating with said fluid connection means.

Preferably said elongate tube includes a first passageway extending from a fluid inlet to a distal end of the tube and a second fluid passageway extending from said distal end to a fluid outlet adjacent said fluid inlet. The first and second fluid passageways may be arranged concentrically or side by side, separated by an internal dividing wall within the elongate tube. Where the first and second fluid passageways are arranged concentrically, said first passageway, comprising an inlet passage, may be defined by an annular space between in and outer concentrically arranged pipes, and said second passageway, comprising an outlet passage, may be defined by the inner one of said concentrically arranged pipes.

The fluid connection means may be arranged such that the plurality of elongate tubes are connected in parallel, whereby a cold fluid inlet communicates with an inlet end of the first passageway of each elongate tube and a heated fluid outlet communicates with an outlet end of the second passageway of each elongate tube.

Preferably said connection means of each elongate member is defined by a tubular passage extending through said end fitting and being open on opposing sides of said end fitting to communicate with a corresponding passage of adjacent elongate member, said tubular passage having a central dividing wall dividing the passage into an inlet stream and an outlet stream, said first passageway of the elongate tube communicating with said inlet stream and said second passageway communicating with said outlet stream. Alternatively, the inlet stream and outlet stream may be defined by separate substantially parallel passageways extending through the end fitting.

In an alternative embodiment said radiation absorbing surface of each elongate member is in thermal contact with an evaporator section of a heat pipe comprising an elongate tube containing a heat transfer medium, a second section of said elongate tube, defining a condenser section of the heat pipe, being in thermal contact with a fluid chamber defined within said elongate member, preferably within said end fitting, and communicating with said fluid connection means to enable heat transfer between said fluid to be heated and said heat transfer medium.

In such embodiment, said fluid chamber of each elongate member may be defined by a passage extending through said end fitting having an opening at either end thereof to define said fluid connection means for fluid communication with a corresponding fluid chamber of adjacent elongate members, the condenser section of the elongate tube passing into or forming a wall portion of said fluid chamber to permit heat transfer between fluid within said chamber and a working fluid within said condenser section.

The present invention combines a number of previously separate components and therefore reduces the overall complexity of the solar collector resulting in lower cost and material usage without any compromise in the efficiency, ease of assembly and reliability of the solar collector.

BRIEF DESCRIPTION OF THE DRAWINGS

Preferred embodiments of the present invention will now be described, by way of example only, with reference to the accompanying drawings, in which:—

FIG. 2 is an exploded perspective view of part of a solar collector according to a first embodiment of the invention with a direct-flow type of tube and an end fitting;

FIG. 11 is a perspective view of a single solar collector with a first embodiment of an outer protective casing;

FIGS. 12 to 19 are perspective views illustrating the removal of a tube from the protective casing of FIG. 11;

FIG. 29 is a perspective view of a second embodiment of the invention for the heat-pipe type of tube;

FIG. 30 is a cross-section on the line XXX-XXX of FIG. 29 of a solar tube of the heat-pipe type;

FIG. 32 is a cross-sectional view of FIG. 31;

DETAILED DESCRIPTION

Figure 1:
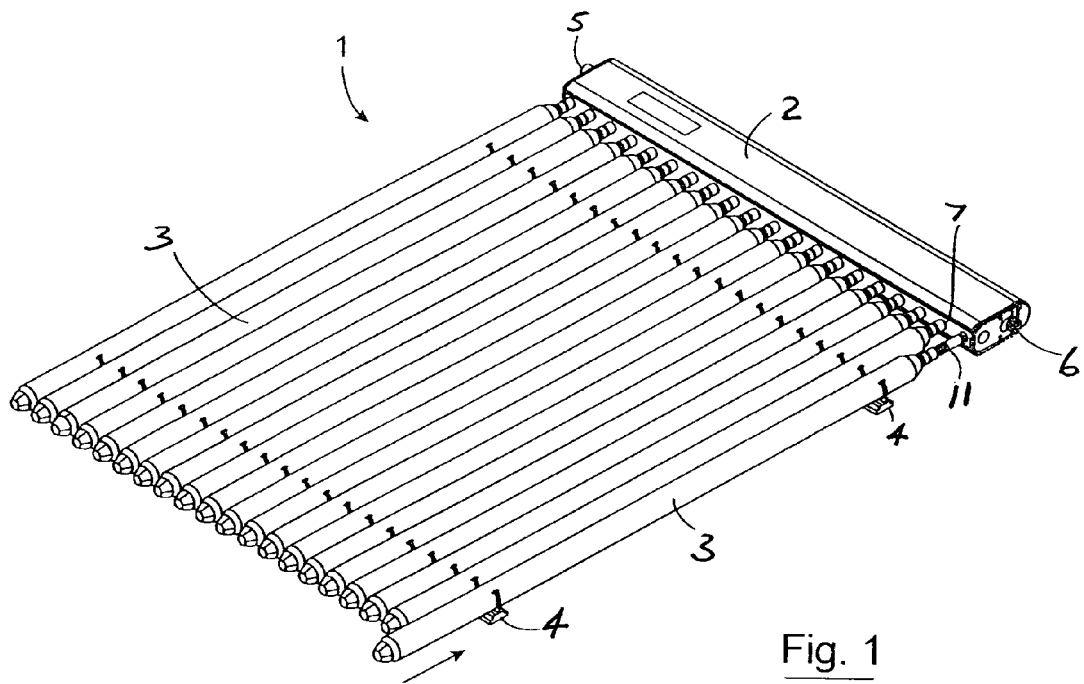
FIG. 1 is a perspective view of a prior art solar collector.
Figure 3:
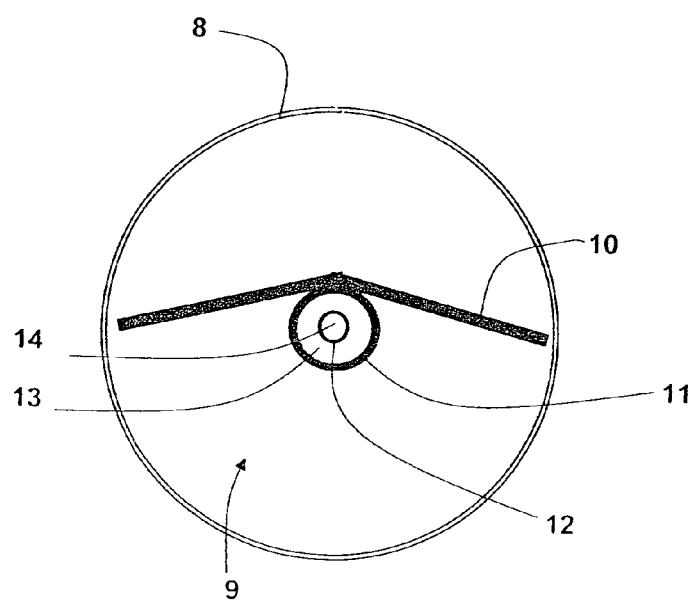
FIG. 3 is a cross-section on the line III-III of FIG. 2 of a solar collector tube of the direct flow type.
Figure 4:
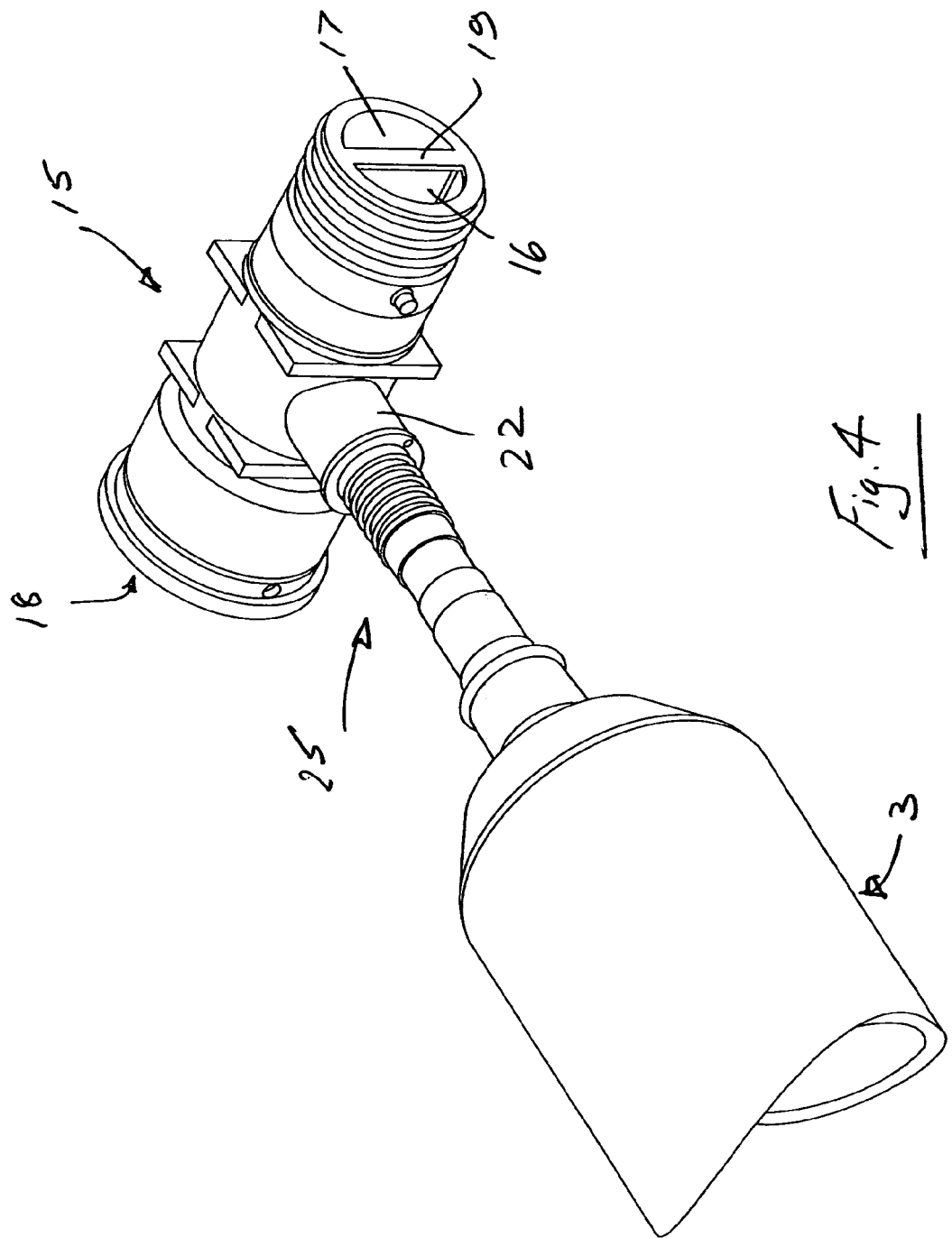
FIG. 4 is a perspective view of the connected solar tube and an end fitting in a first embodiment of the invention for the direct flow type of tube.
Figure 5:
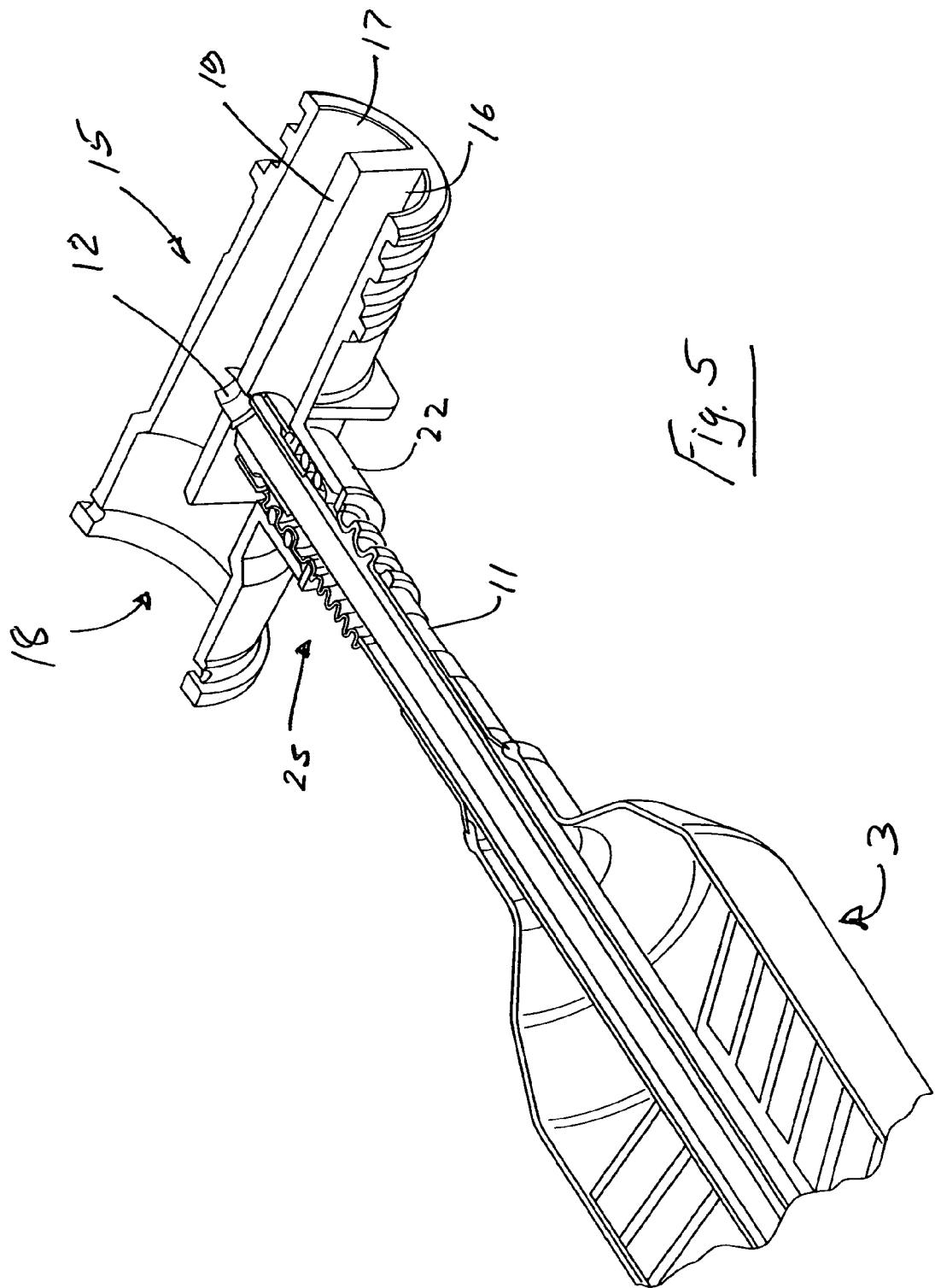
FIG. 5 is a cut-away cross-sectional view of FIG. 4.
Figure 6:
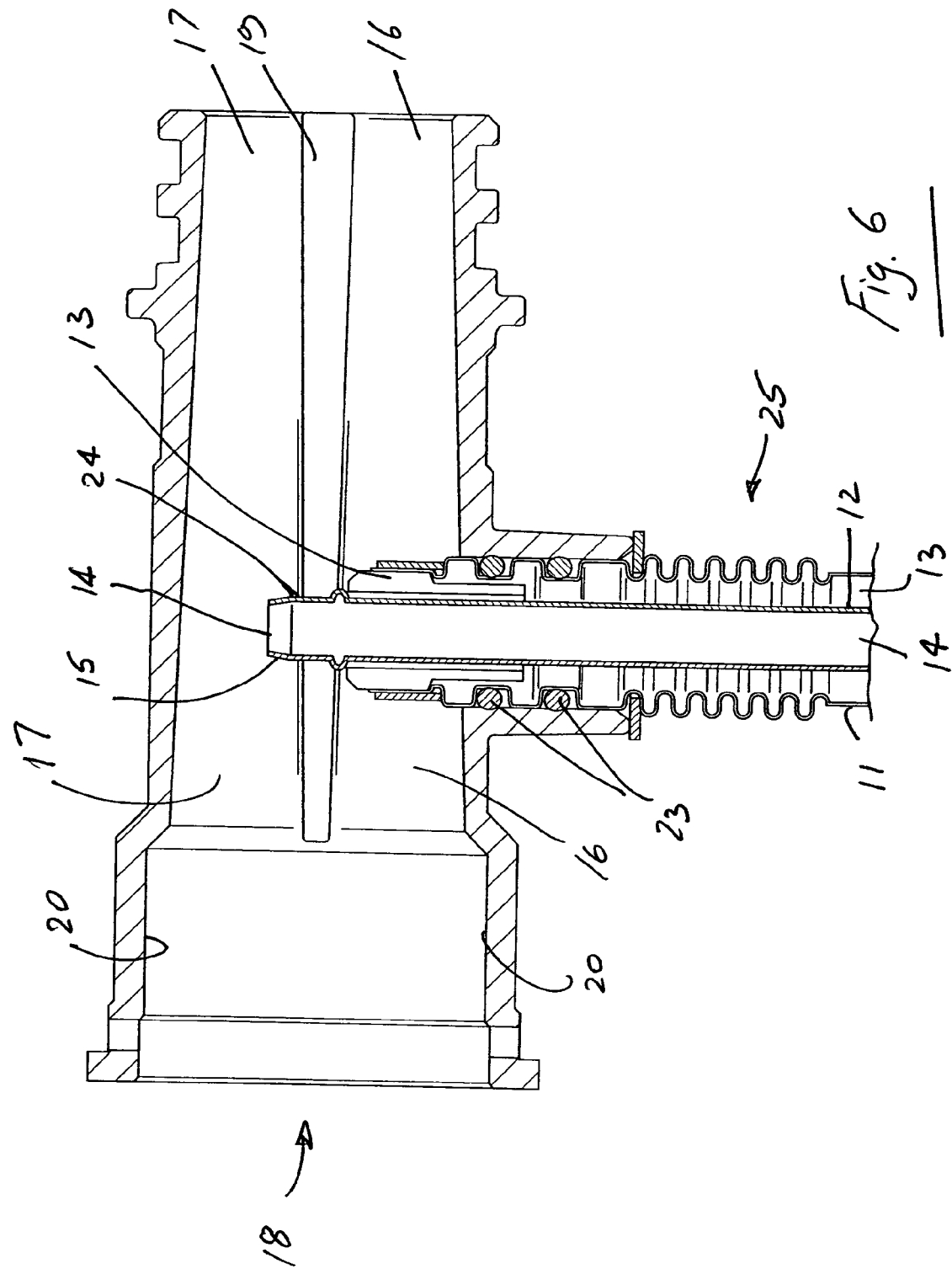
FIG. 6 is a planar cross-sectional view of the connected tube of the direct flow type with the end fitting.

As illustrated in FIG. 2 to FIG. 28 a solar collector assembly according to a first embodiment of the present invention of the direct flow type comprises a solar absorbing tube 3 comprising an evacuated radiation transparent enclosure 8 enclosing an absorbing section 9, comprising a radiation absorbing plate 10 for absorbing solar radiation and an elongate tube 1, containing a working fluid (heat transfer medium), in thermal contact with said radiation absorbing plate 10. The elongate tube 1 contains a concentrically positioned inner pipe 12 thereby forming two concentric internal flow passageways 13, 14 for the flow of a fluid to be heated. The elongate tube 1 extends out of one end of the solar absorbing tube 3 and into an end fitting 15 wherein an annular outer passageway 13 of the elongate tube 1 communicates with a cold fluid inlet conduit stream 16 within the end fitting 15 and the inner passageway 14 of the elongate tube 1 communicates with a hot fluid outlet conduit stream 17 within the end fitting 15. Fluid passes from the annular outer passageway 13 to the inner passageway 14 via a flow path provided at a distal end of the elongate tube 1.

The end fitting 15 incorporates a tubular passage 18 having a central dividing wall 19 dividing the passage 18 into said cold fluid inlet conduit 16 and said hot fluid outlet conduit 17. The tubular passage 18 extends transversely across the end fitting 15 and is open at each side of the end fitting whereby a fluid can flow between the tubular passages 18 of adjacent solar tubes 3. The open ends of the passages 18 comprise recesses to provide a circumferential seat 20 for an O-ring 21 or similar sealing means to provide a fluid-tight seal when adjacent end fittings 15 are connected together.

Each tubular passage 18 is provided with a receiving portion 22 extending orthogonally to the tubular passage 18 for receiving an end of the concentric elongated tube 1. One or more O-ring seals 23 are located within annular seats around the periphery of the pipe for providing a seal between the end of the pipe 1 and the pipe receiving portion 22.

The inner pipe 12 of the concentric elongate tube 1 defining said inner passageway 14 extends beyond the outer part to extend through an aperture 24 in the dividing wall 19 of the tubular passage 18 whereby the annular outer passageway 13 of the double walled pipe communicates with one side of the tubular passage 18, defining the cold fluid inlet stream 16, and the inner passageway 14 communicates with the other side of the tubular passage 18, defining the hot fluid outlet stream 17.

An end region of the outer wall of the double walled pipe 1 includes a flexible section 25 in the form of a corrugated or convoluted section of tube to provide a degree of flexibility to allow for slight misalignment of the pipe and to absorb shocks or impacts.

The end fitting 15 may be formed from a temperature resistant polymeric material, possibly by injection moulding.

Figure 7:
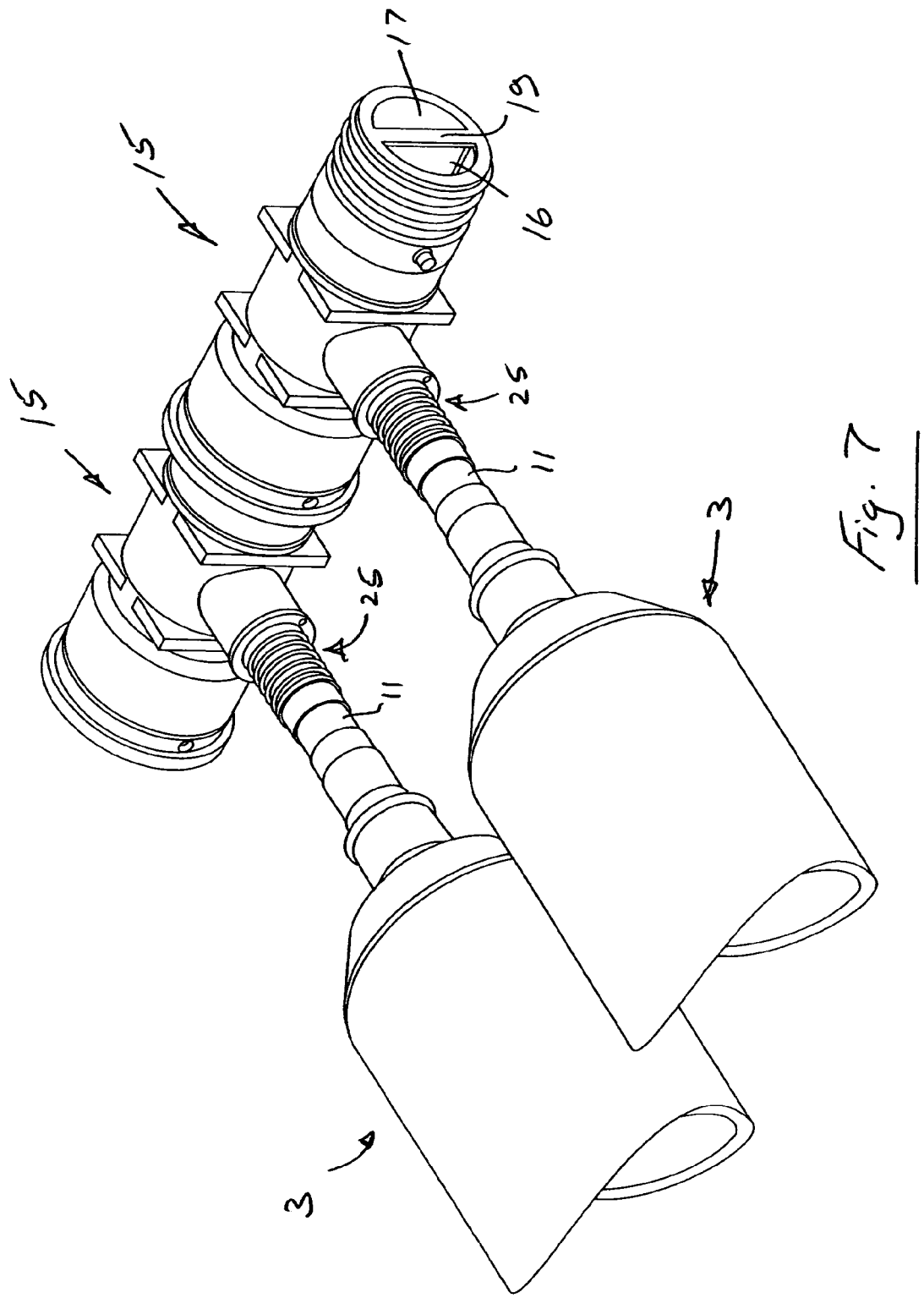
FIG. 7 is an isometric view of two of the end fittings and tubes in a first embodiment of the connection technology.
Figure 8:
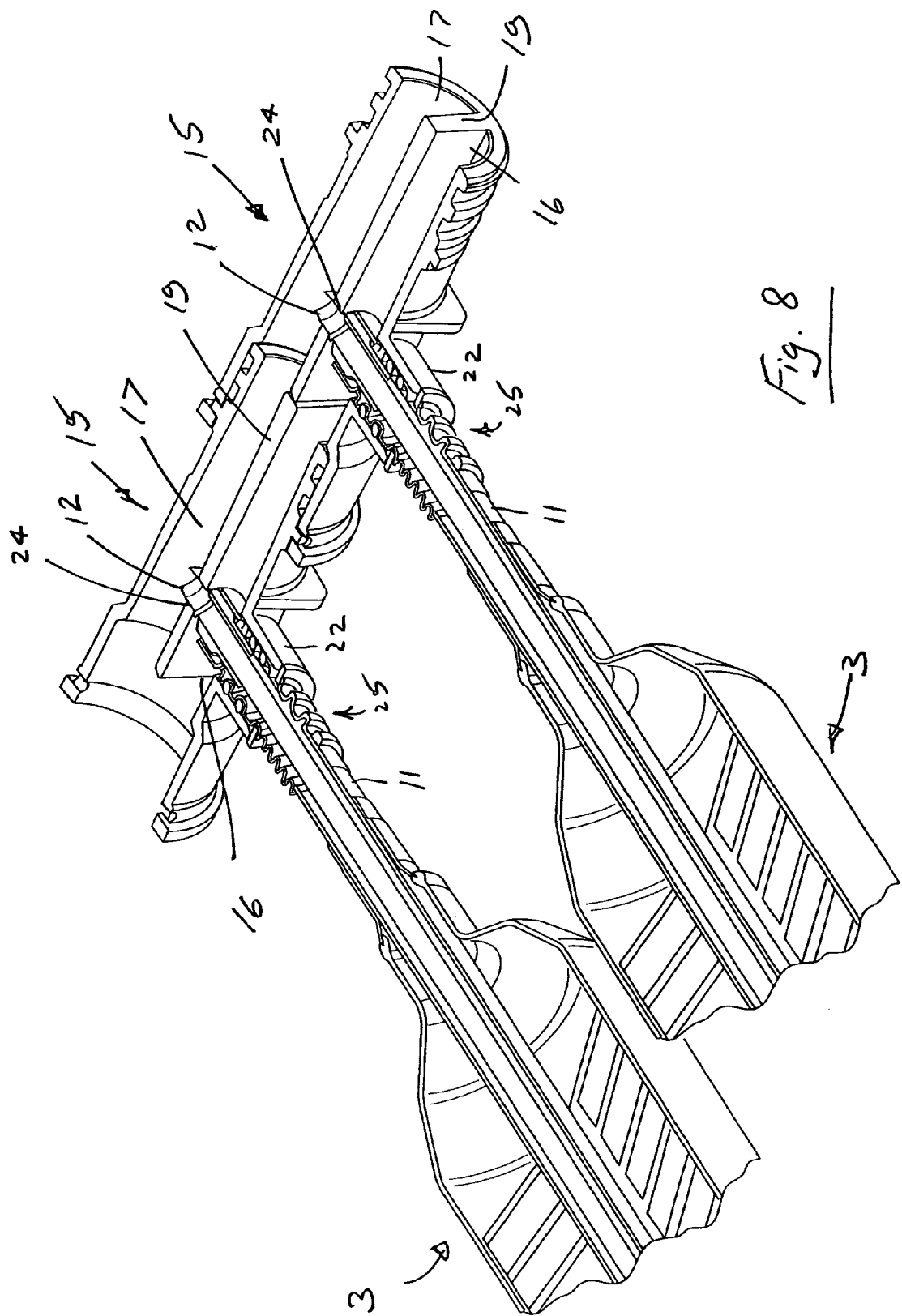
FIG. 8 is a cut-away partially cross-sectional view of the end-fittings and tubes of FIG. 7.
Figure 9:
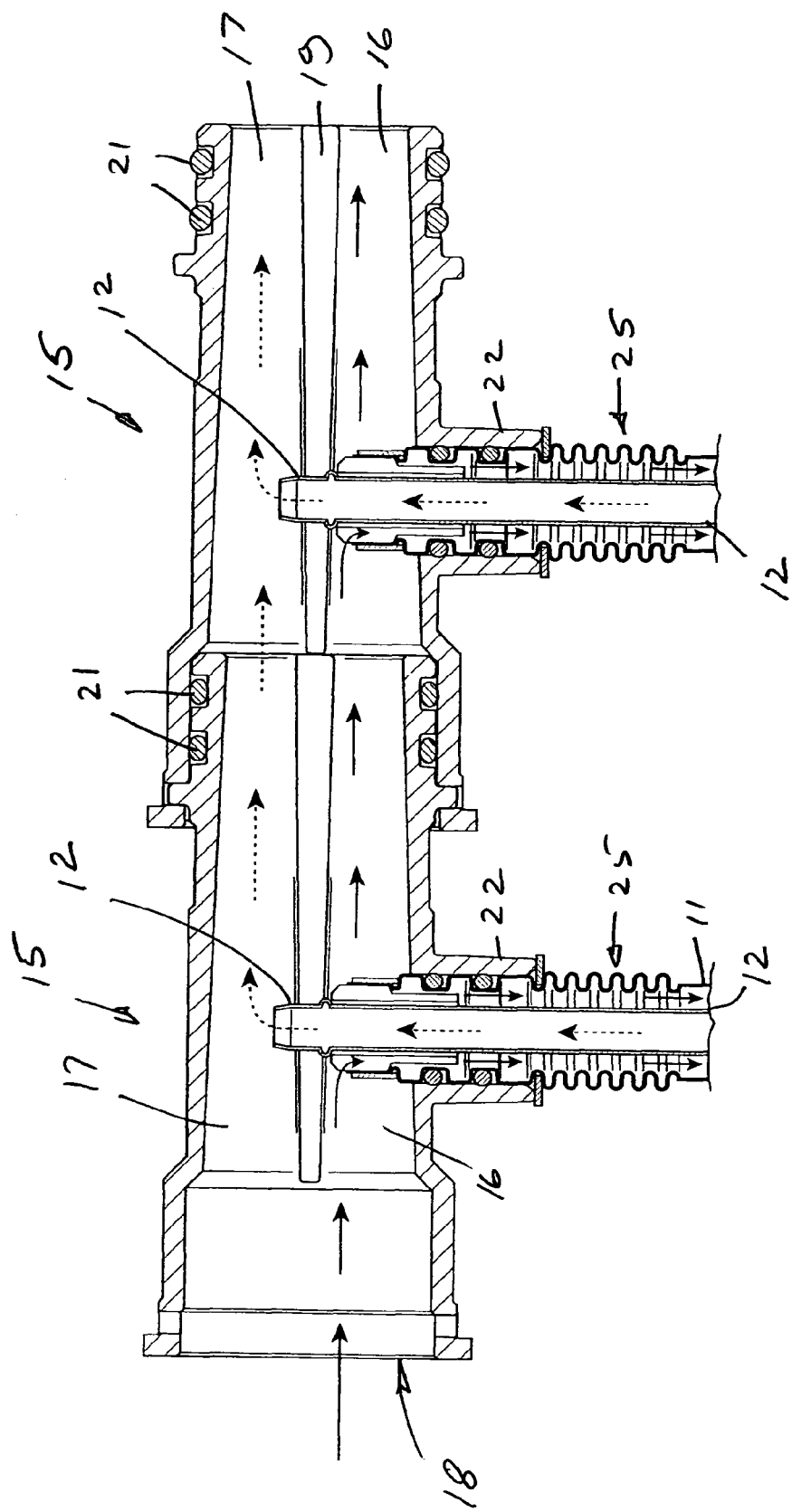
FIG. 9 is a cross section of the two end fittings and tubes of FIGS. 7 and 8.

FIGS. 7 to 9 show the connection of two end-fittings 15 connected to two solar tubes 3 of the direct flow type. The inlet flow channel 16 of one of the end fittings 15 communicates with the inlet flow channel 16 of the adjacent end fitting 15. In addition, the manner in which the outlet flow channel 17 communicates with the outlet flow channel in the adjacent end fitting 15 is also shown. The flow is illustrated in FIG. 9 in which the dotted line arrow indicates hot fluid flow and the full line arrow indicates cold fluid flow.

Figure 10:
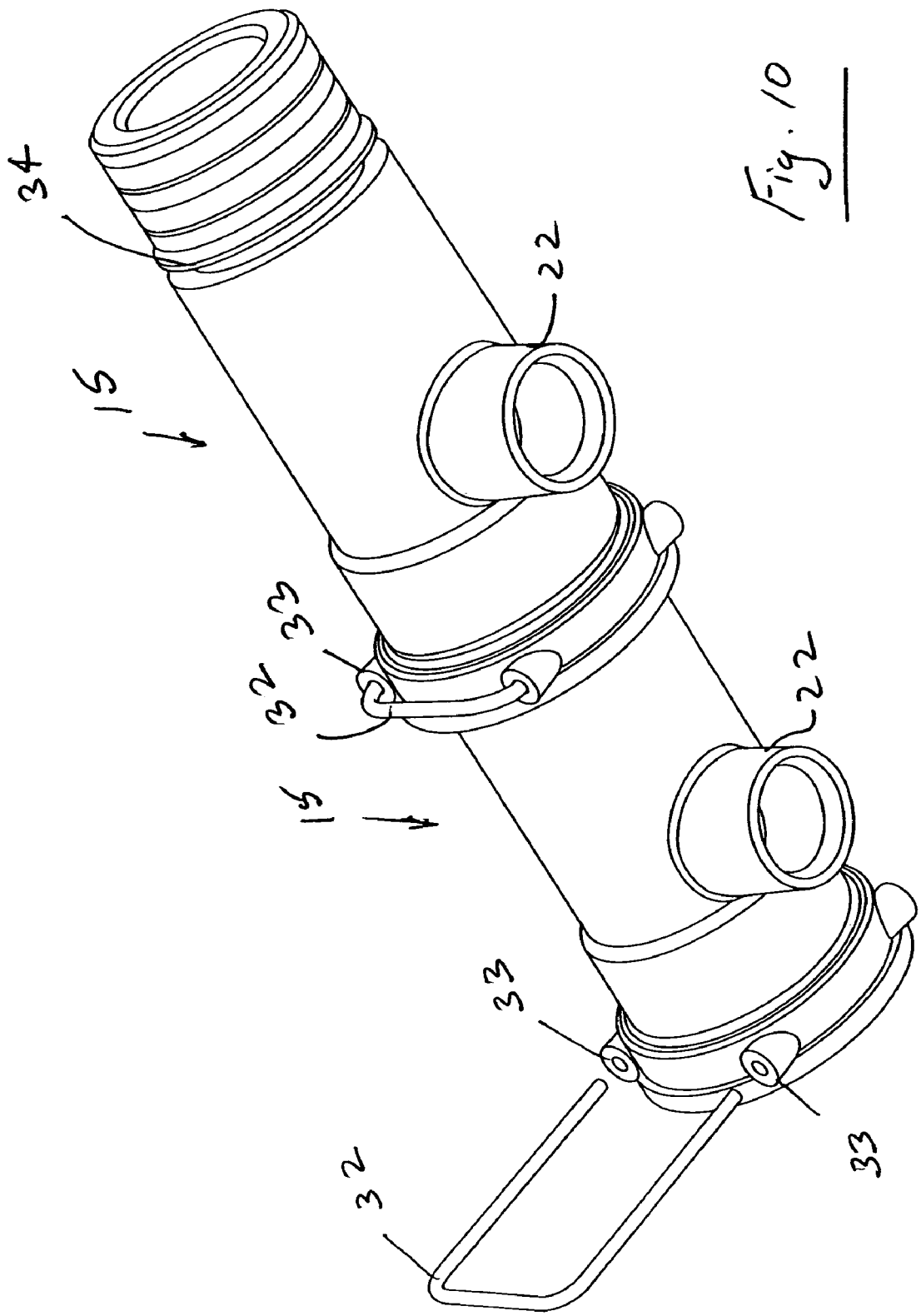
FIG. 10 is a perspective view of two adjacent end fittings connected together with a resilient clip in place.

FIG. 10 illustrates one way for securing adjacent tubes 3 to one another during the installation of a collector using the current invention. A resilient clip 32 is located into two channels 33 on one side of the end fitting 15 that engage with a circumferential inclusion 34 on the opposite end of an adjacent end fitting 15 to provide a secure locking mechanism to withstand the high-pressure conditions that are normal in this field. Various other connection technologies that may be utilised include a twist lock fitting where an inclusion on one end-fitting 15 engages with a protrusion on an adjacent end fitting, or a clamp that engages with circumferential inclusions or protrusions on opposite faces of adjacent end-fittings in order to secure the two end fittings together.

Figure 19:
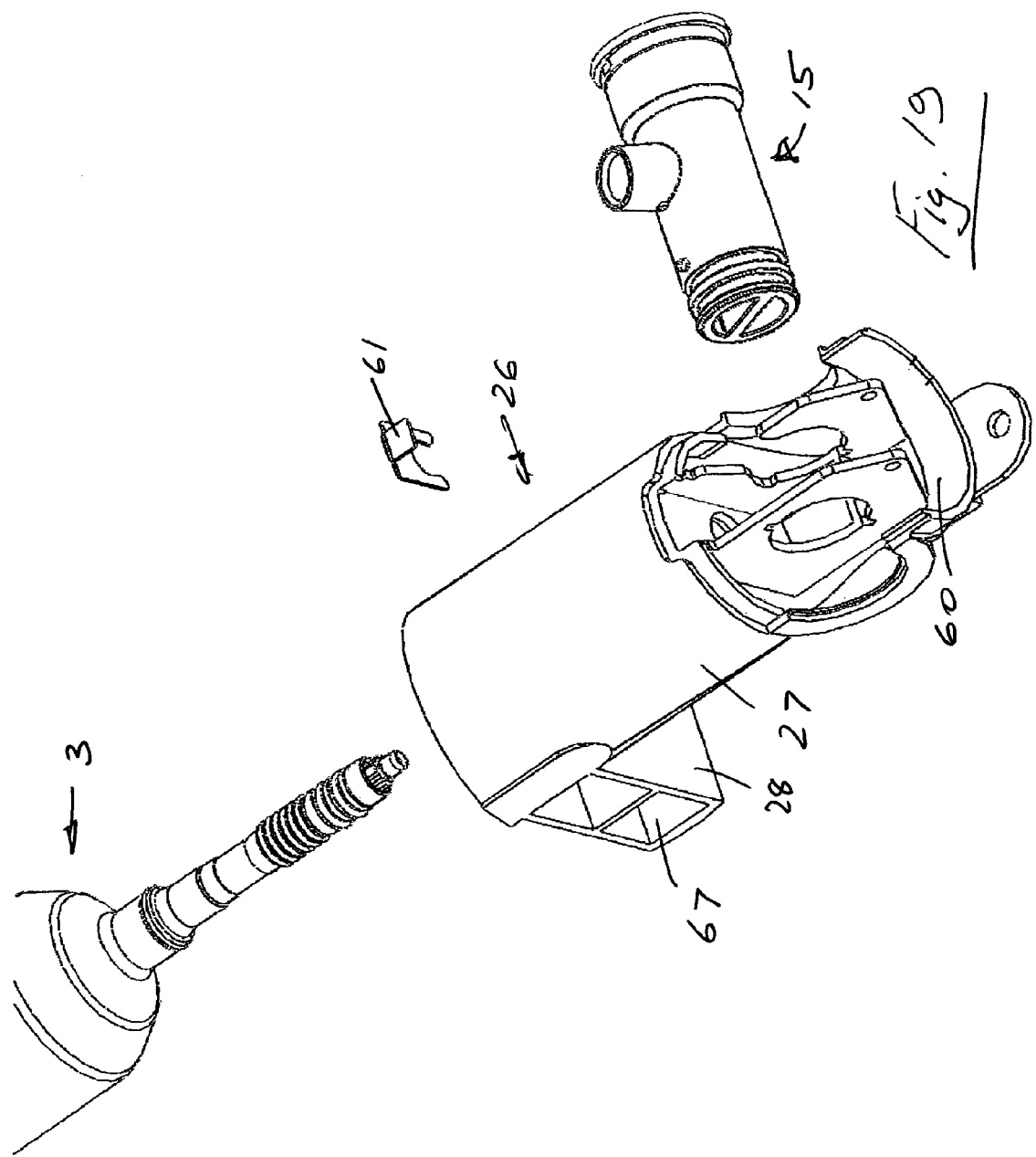
Figure 20:
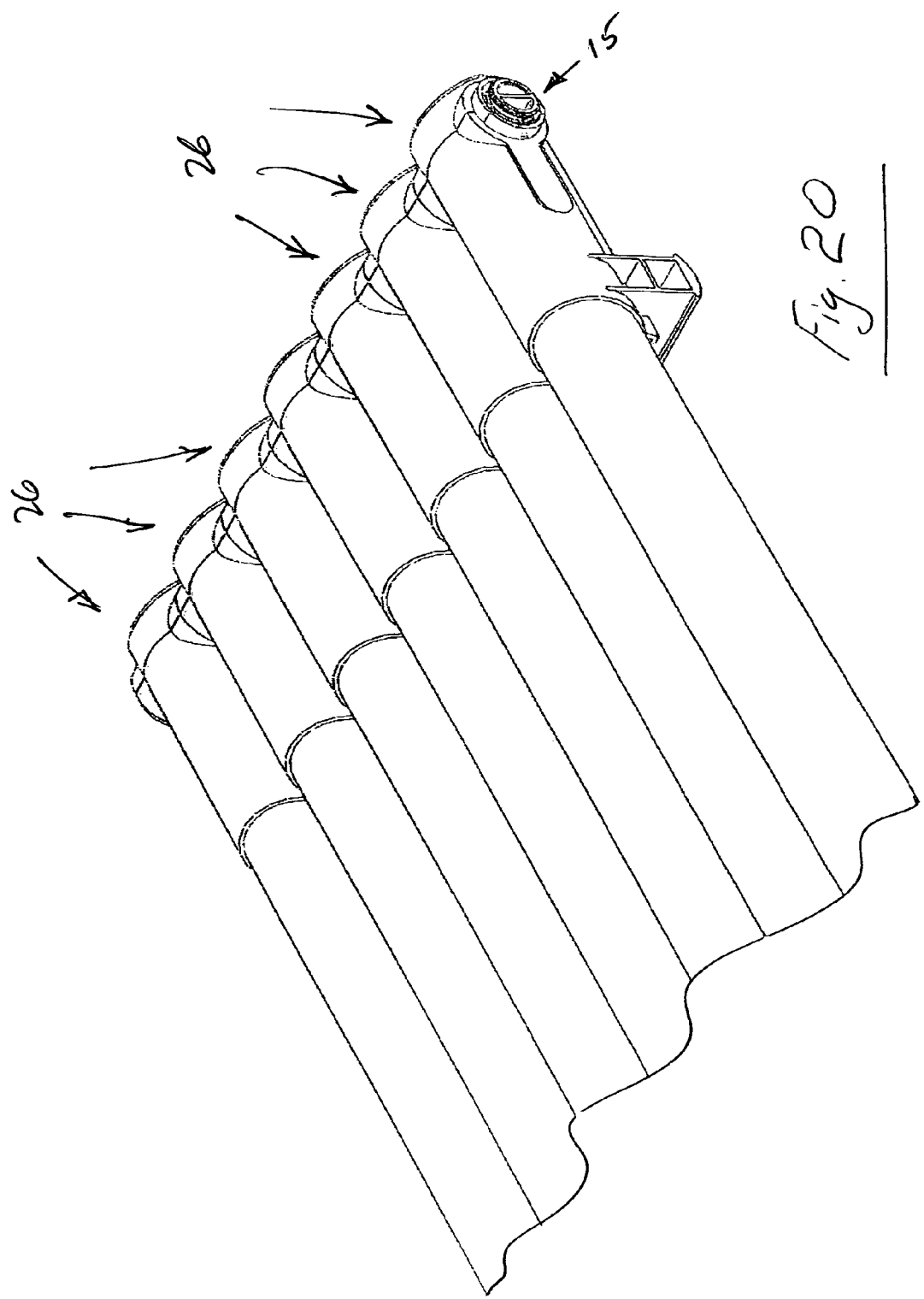
FIG. 20 is a perspective view of a number of tubes with the connection technology of the invention when combined together.

In one embodiment of the invention the end fitting 15 is encased in a protective enclosure 26 as shown in FIGS. 11 to 27. In a first embodiment of the protective enclosure 26 this consists of a main body enclosure 27 that has an integral support structure 28. Additionally the protective enclosure is provided with a removable end-cap 29 and an inlet port 30 and outlet port 31 to allow for the insertion of the end-fitting 15. A plurality of solar collector tubes incorporating the end fitting 15 and the protective enclosure 26 of the present invention are shown in FIG. 20.

FIGS. 11 to 19 show by way of an example a schematic of a single tube of a first embodiment of the invention. When assembled the direct flow type and the heat pipe type will have the same external aesthetic appearance. The finished tube comprises an upper fitting 50, a solar tube 3 and a lower fitting 51. Preferentially both upper fitting 50 and lower fitting 51 are provided with channels 52 to allow for the insertion of supporting structures.

FIGS. 20 to 28 further show the assembly of a number of tubes using the present invention to construct a solar collector.

The end fitting 15 fits into a protective enclosure 26 that comprises; a main body enclosure 27 (that includes an integrated structure for supporting the tube when installed), a top cover 60 and an end-cap 29. A retaining clip 61 is provided to secure the tube into the end enclosure 26.

A tube 3, end fitting 15, and protective enclosure 26 are assembled as follows. Referring initially to FIG. 19 the end fitting 15 is located into position in the main body enclosure 27. The fitting 15 is inserted with the tube receiving port 22 facing upwards and sliding the end fitting 15 horizontally into position in the main body enclosure 27 (see FIG. 18). Once the end fitting 15 is in position it is rotated through ~90 degrees (see FIG. 16) until the tube receiving port 22 is facing the tube 3. The end fitting 15 will preferentially clip/lock into position by this 90 degree rotation action during assembly in the factory.

The tube is then inserted into the large open end of the main body enclosure 27 so that the flexible neck/condenser of the tube fits into the end fitting 15. Once the tube is inserted it is secured in position by the retaining clip 61. The retaining clip 61 engages with a convolution of the flexible bellow either on a direct flow or heat pipe tube when it is inserted to hold it in place. Once the retaining clip 61 is secured in place the tube cannot be removed from the main body enclosure 26 as the clip 61 is secured against an internal planar face of the main body enclosure thereby stopping the tube being removed.

Once the tube is secured in position the top cover 60 (see FIG. 14) is put in place and pivots to a closed secure position as illustrated in FIG. 13. The top cover 60 pivots so that should a tube 3 need to be removed at a later stage the top cover 60 can pivot to an open position, thereby allowing access to the retaining clip 61 (so that is can be disengaged/removed) to allow the tube 3 to be removed from the main body enclosure 26.

When the top cover 60 is in a closed position as shown in FIG. 13 the end cap 29 can then be attached as illustrated in FIG. 12. The end cap 29 twist-locks into position and secures the top cover 60 in its closed position. The end cap 29 can be readily removed to aid access to the internal retaining clip 61 to allow for tube removal and replacement.

Figure 11A:
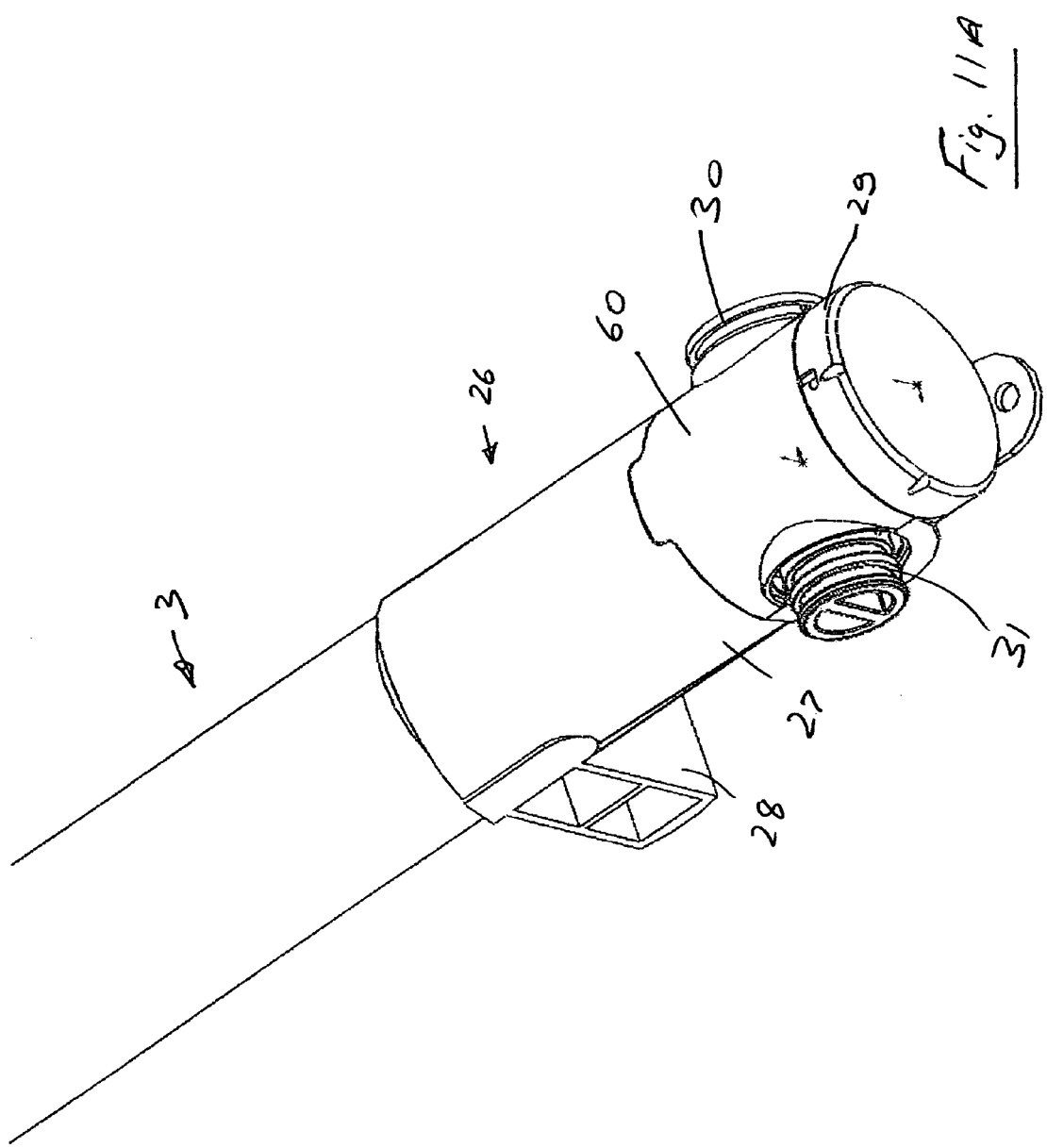
FIG. 11A is an enlarged view of the outer protective casing part of FIG. 11.
Figure 14:
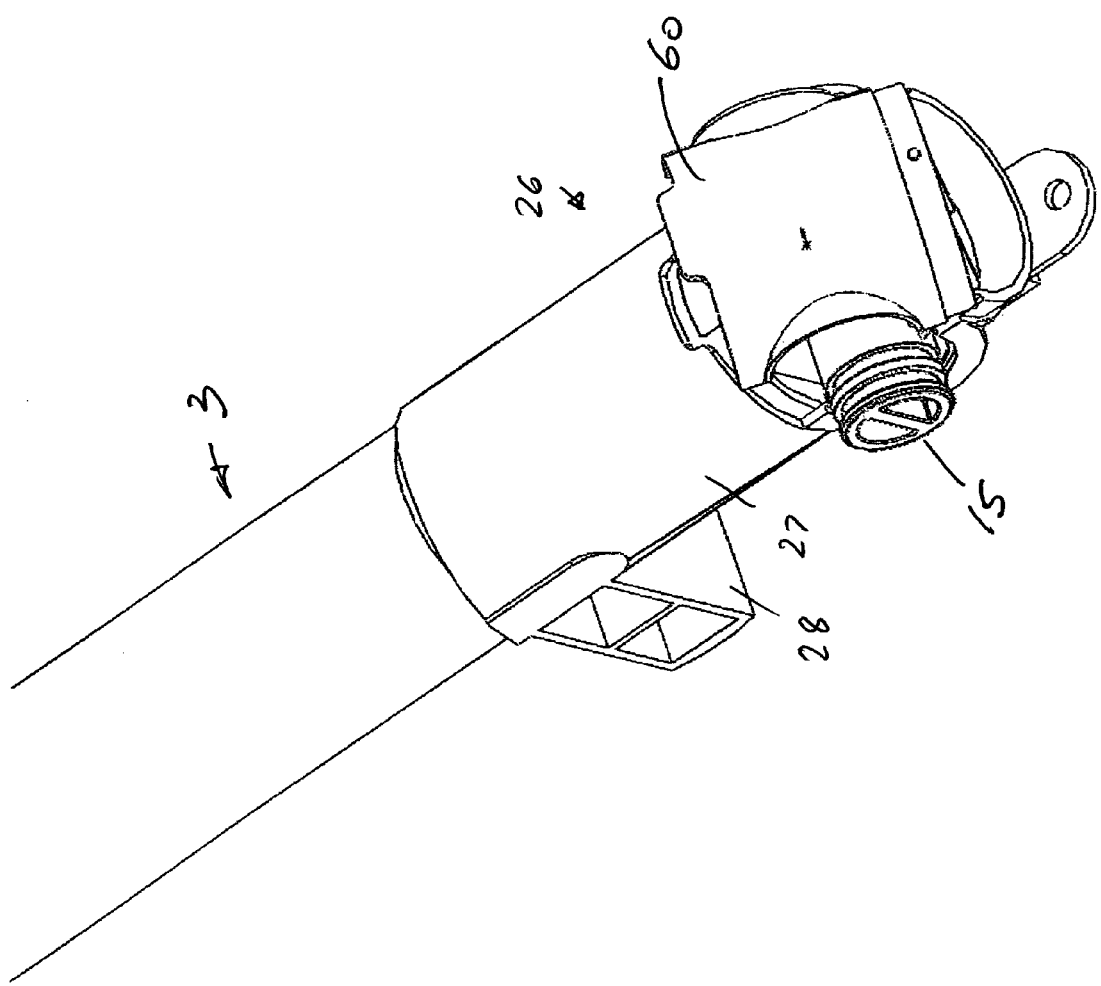
Figure 15:
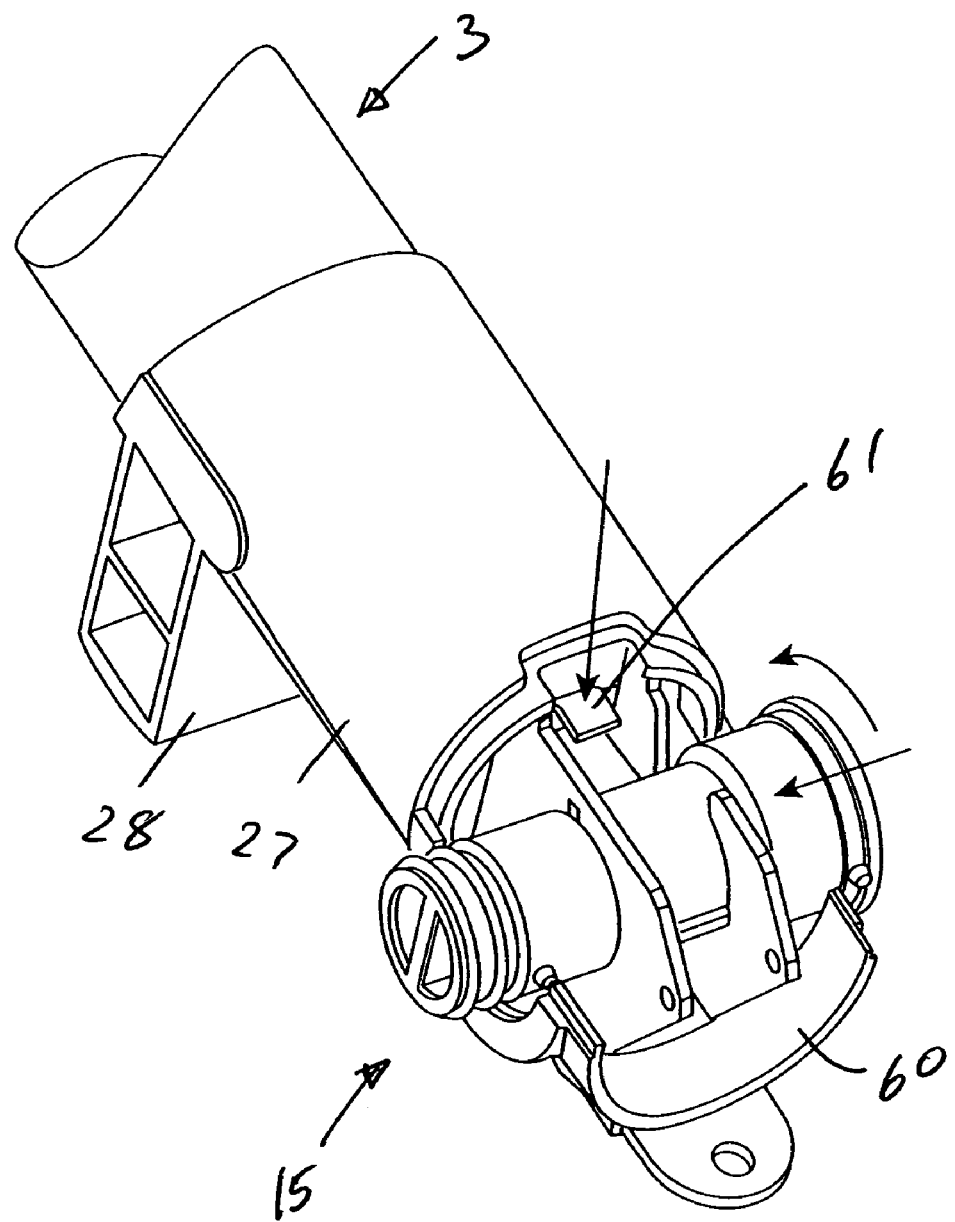
Figure 16:
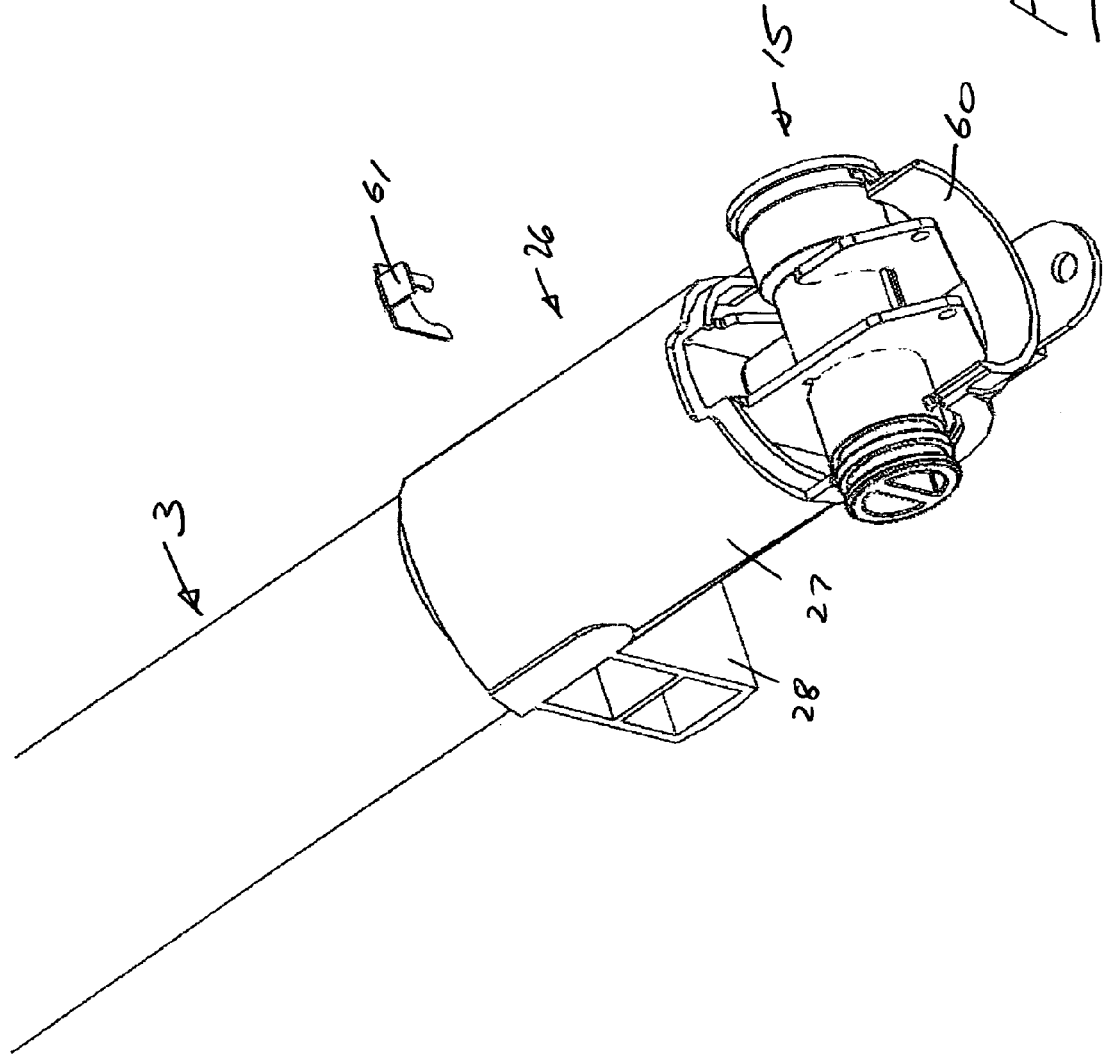
Figure 17:
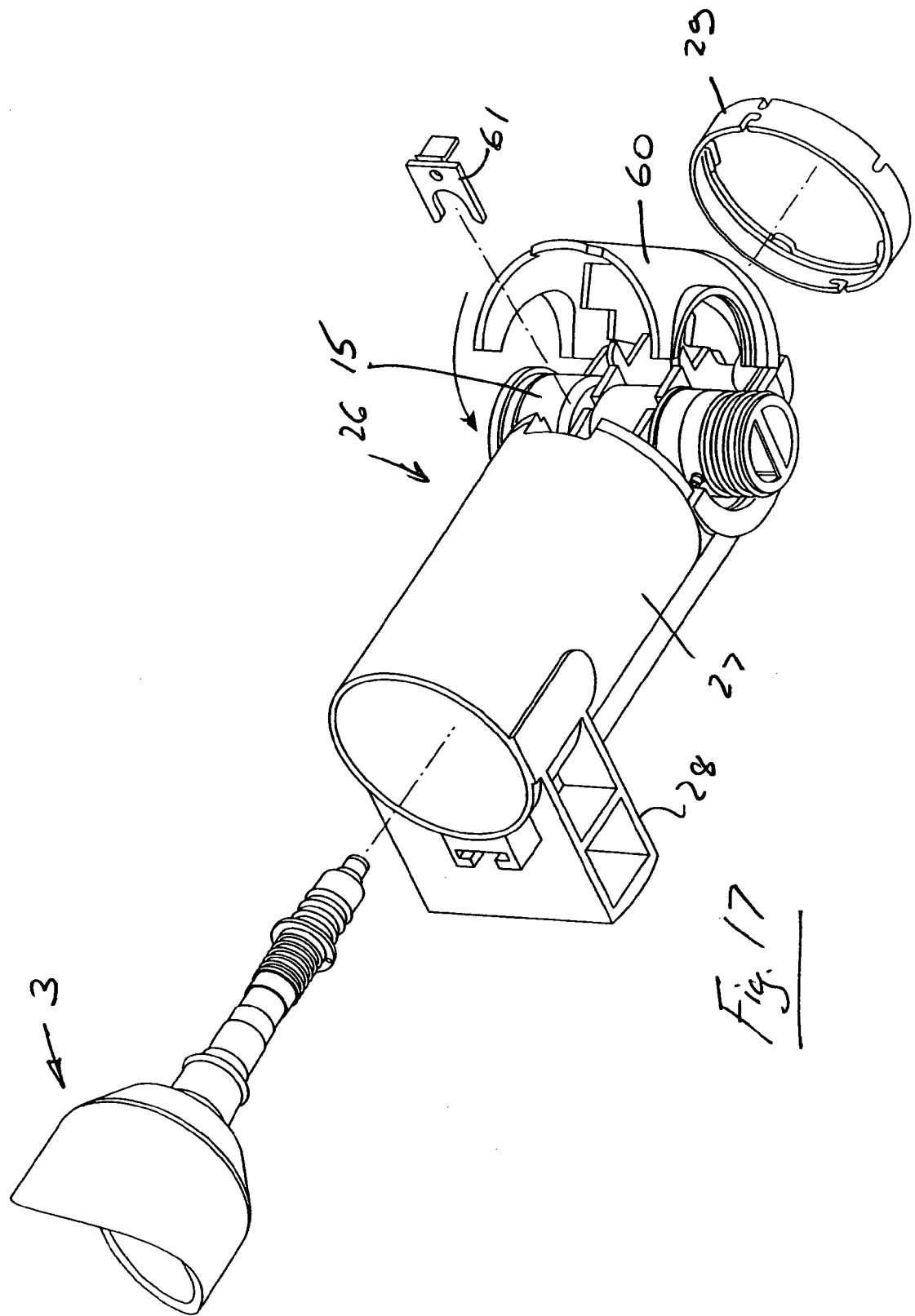
Figure 18:
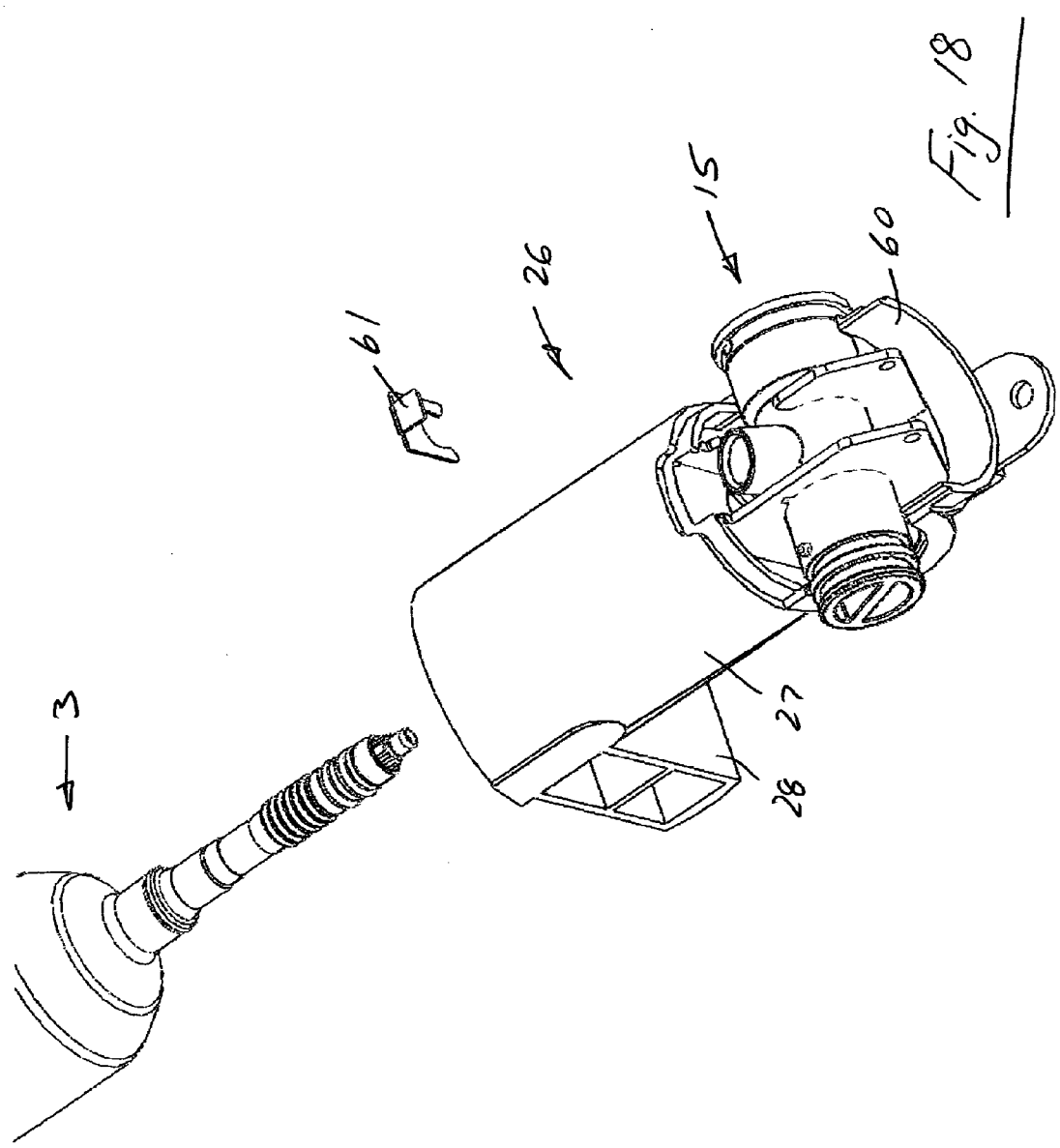

FIG. 11a shows how the finished tube would leave the factory. O-rings 21 would also be fitted in the grooves of 31 (see FIG. 9). It is also an option to ship tubes 3 pre-assembled in groups of 2 or more (ideally 5 or more).

Figure 25:
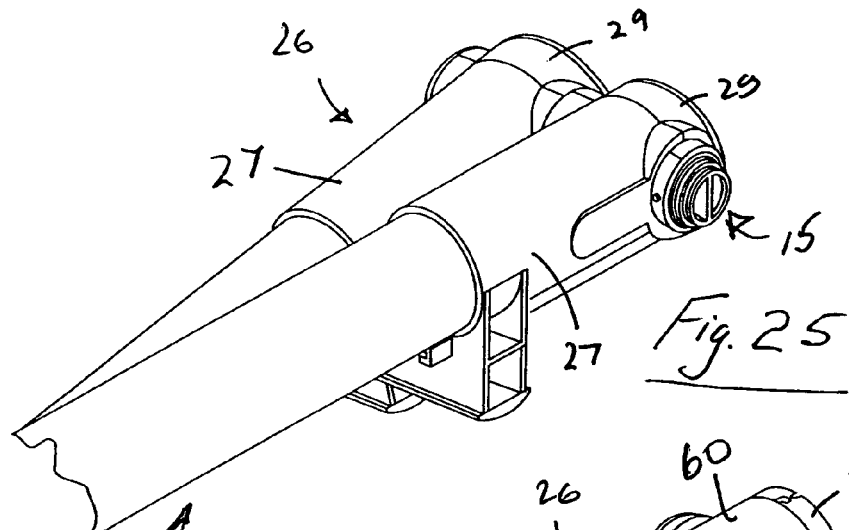
FIGS. 25 to 27 are perspective views of connected tubes with various brackets/mountings.
Figure 26:
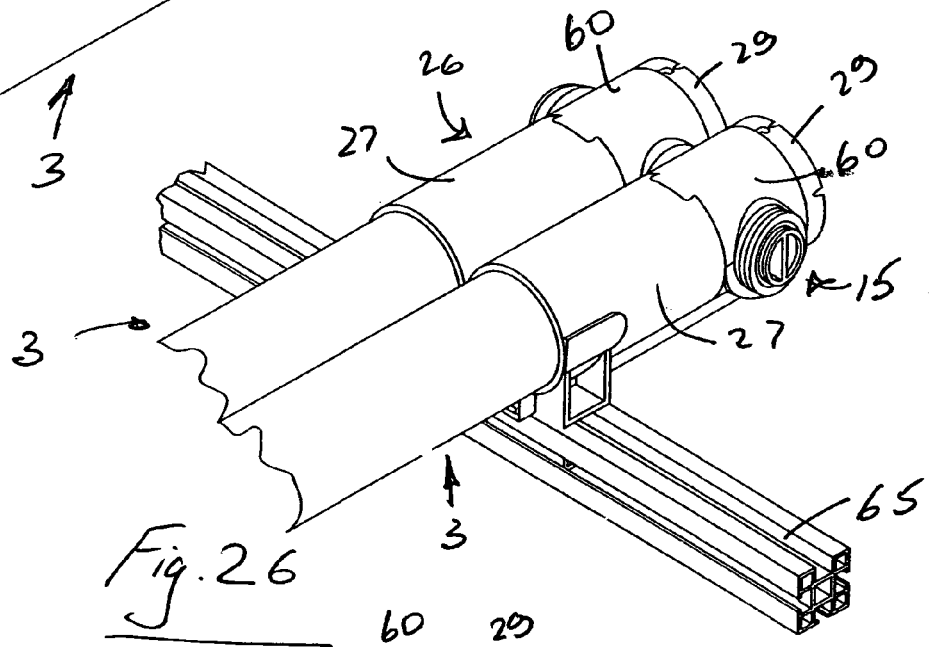
Figure 27:
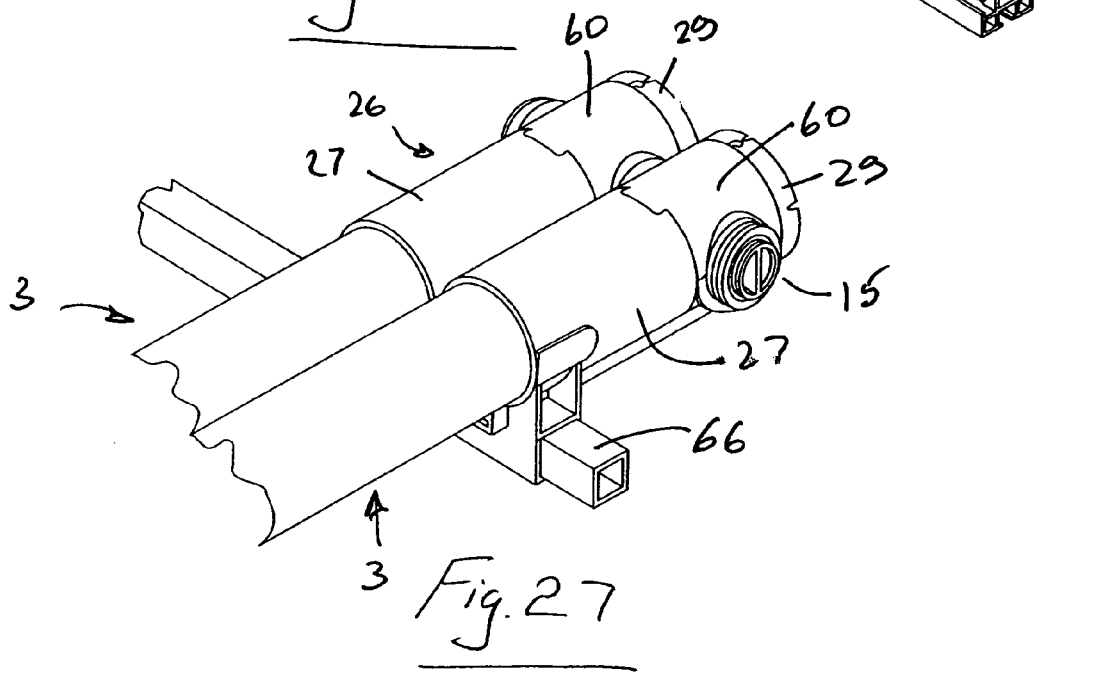

FIGS. 25 to 27 show how the tube may be connected together during installation as follows:

FIG. 25 shows how the tubes can be twist-locked together making use of protrusions/inclusions on the end-fitting 15. A twisting through approx. 20 degrees may be used to lock the tubes together.

FIG. 26 shows tubes being installed onto a rail support 65. The tubes slide along the support rail and are secured together with a clip mechanism 32 as shown in FIG. 10

FIG. 27 shows how the tubes can be pre-assembled and secured together either by a twist-lock securing mechanism or a clip mechanism 32 and a support rail 66 is then inserted through a passageway 67 in the support 28 for the main body enclosure 27.

FIG. 20 shows a multitude of tubes connected together—the product could leave the factory pre-assembled as shown in FIG. 20 or as individual tubes that are assembled on-site in this manner by the installer.

Figure 21:
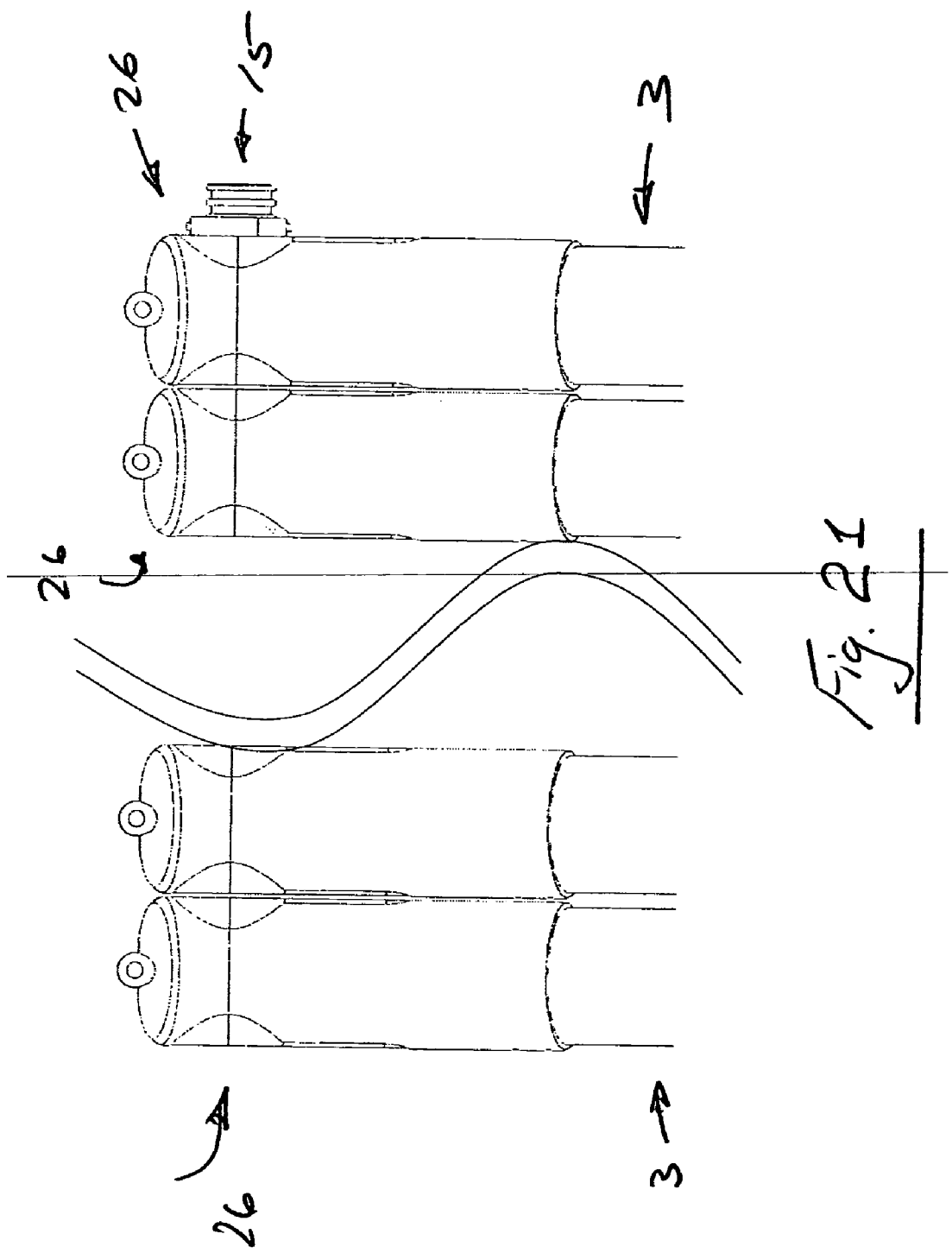
FIG. 21 is a plan view of a number of tubes connected together with protective casings in place.
Figure 22:
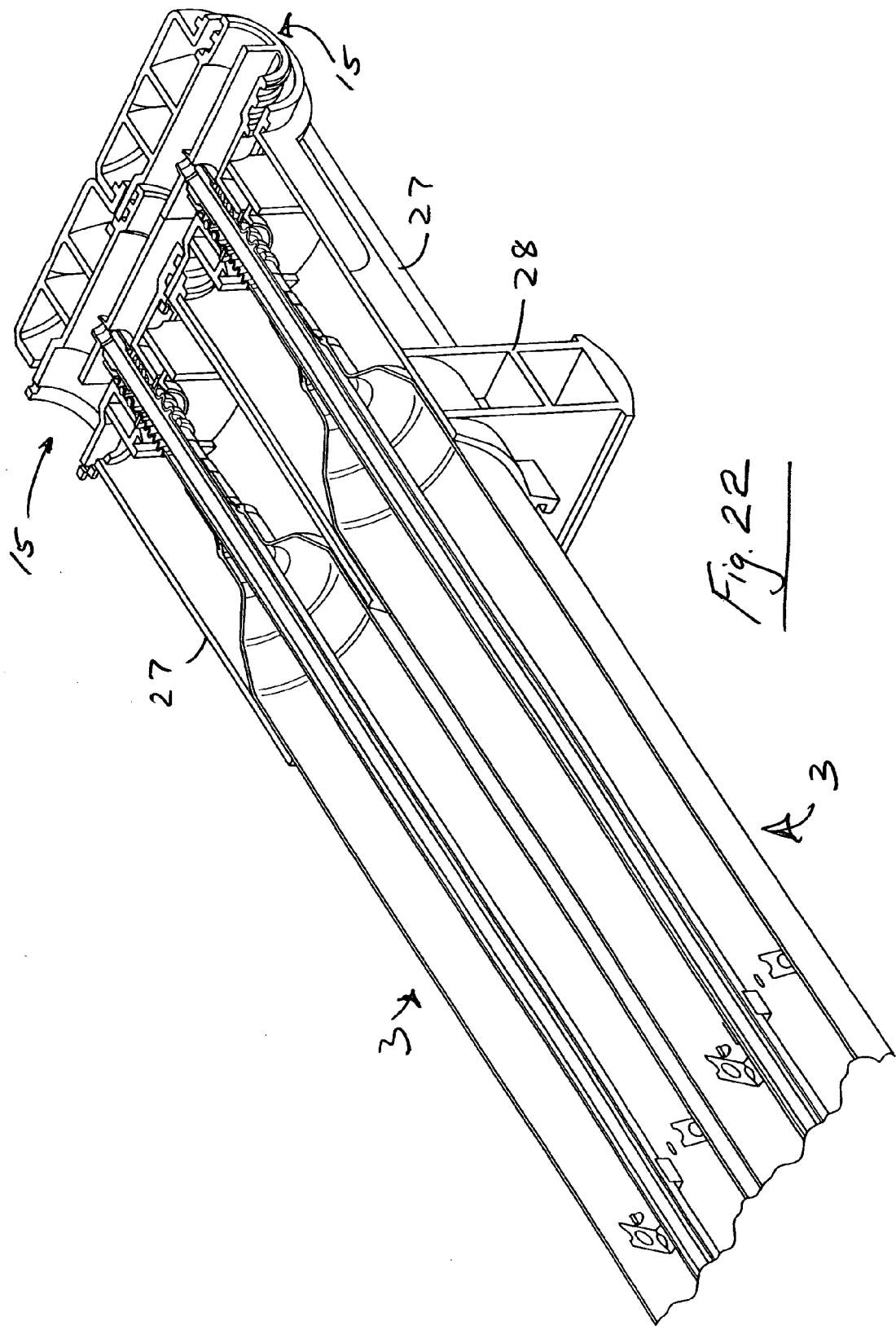
FIG. 22 is a cut-away view of two adjacent tubes connected together with protective casings in place.
Figure 23:
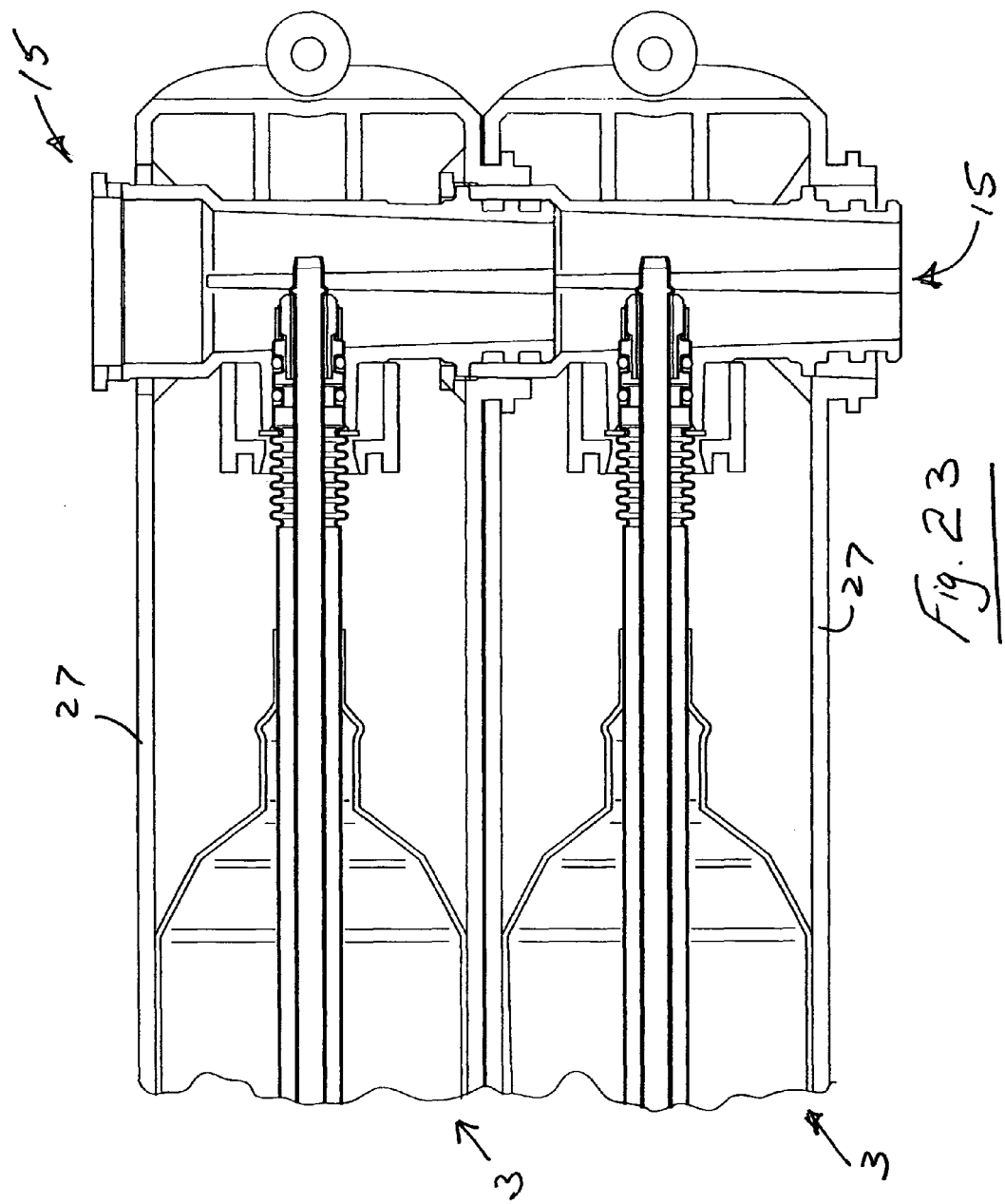
FIG. 23 is a cross sectional view of the assembly of FIG. 22.
Figure 24:
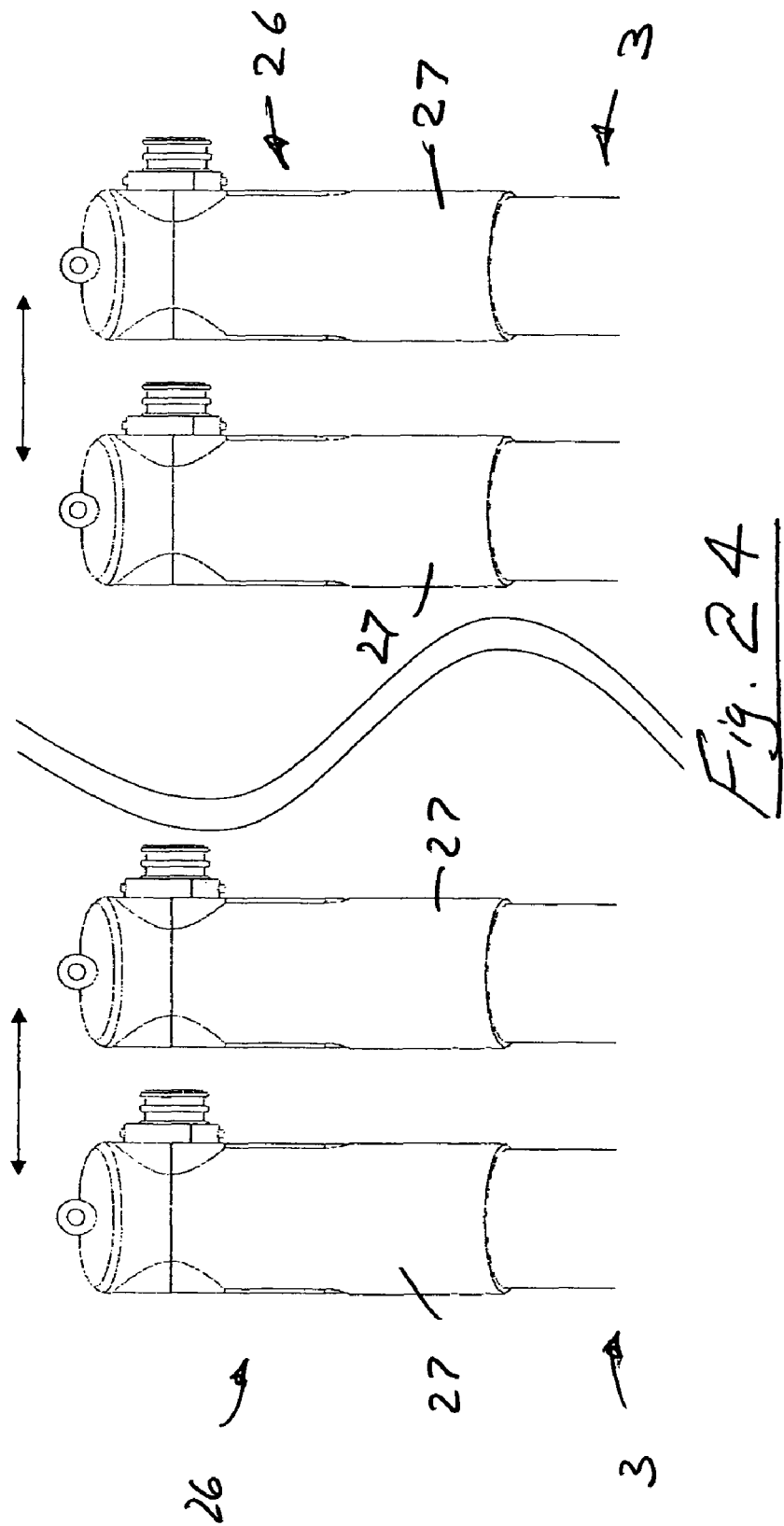
FIG. 24 is a view similar to FIG. 21 showing the tubes disconnected from each other.

Tubes can be connected together in any quantity of 2 or more. FIG. 24 show a plurality of tubes before they are connected together and FIG. 21 shows the same tubes after they are connected.

Figure 28:
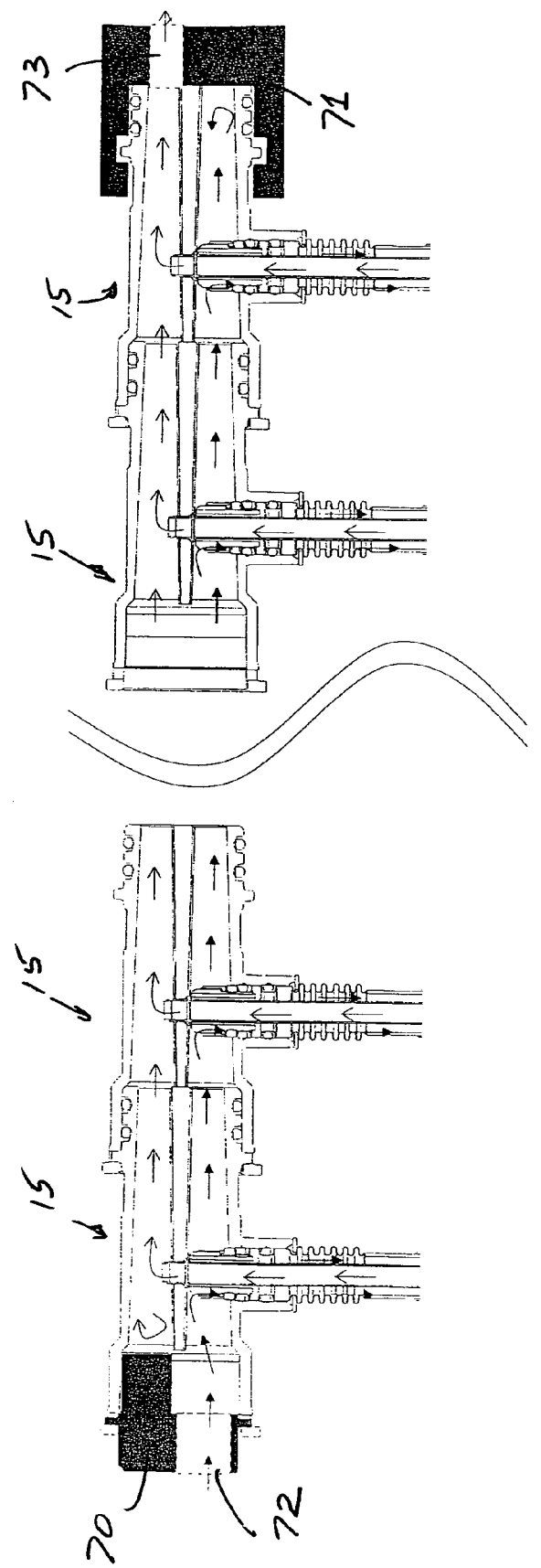
FIG. 28 is a cross sectional view of an assembly of several tubes and end fittings with end connectors in situ.
Figure 31:
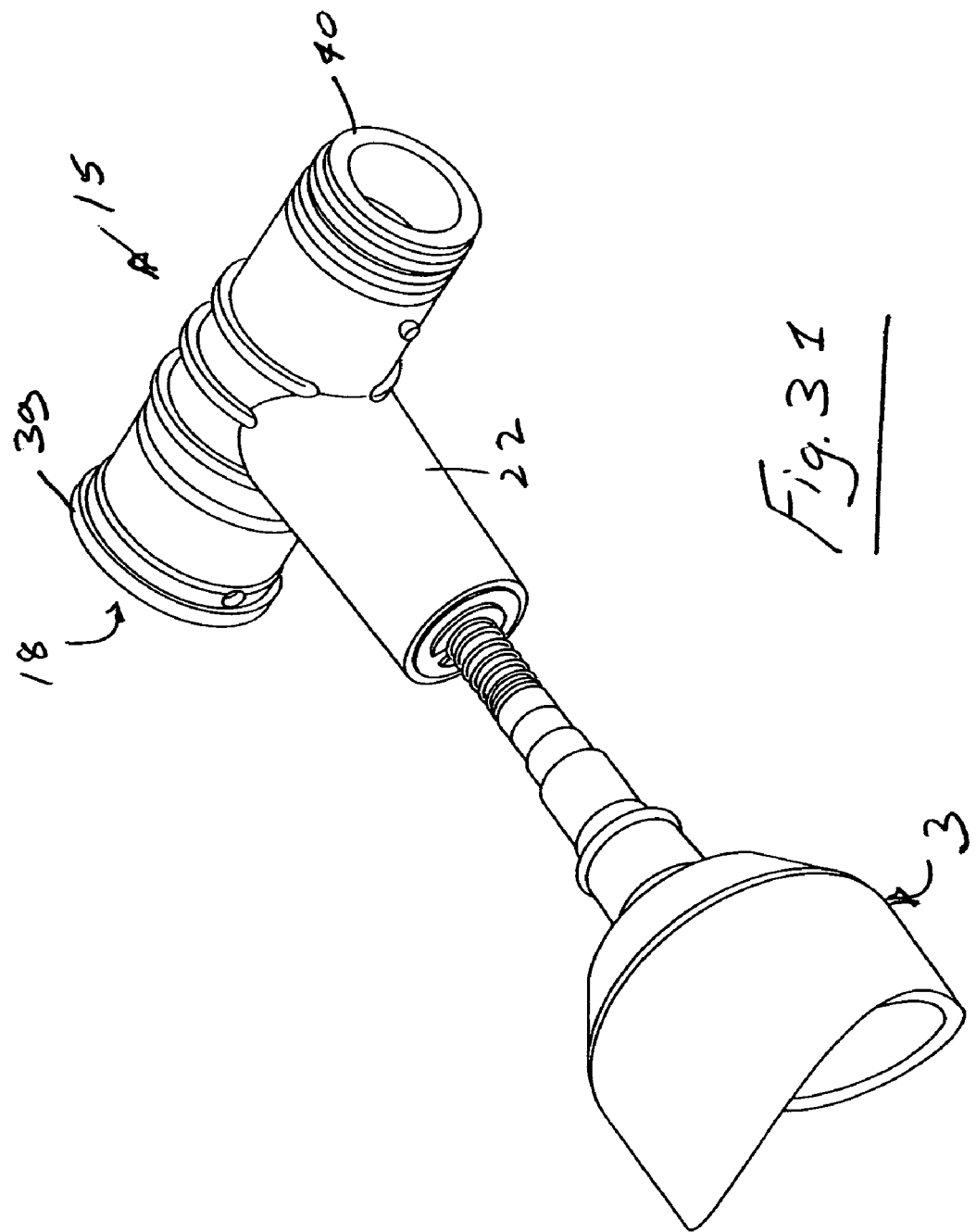
FIG. 31 is a perspective view of the connected solar tube and an end fitting for the heat-pipe type of tube.

FIG. 28 shows the flow paths through the end fittings/tube when one or more tubes are connected. In addition, the black areas 70, 71 at either end indicates end fittings fitted to ensure that the flow characteristics are as required with only one flow channel in and one flow channel out. The end fitting 70 is a male end connector and the end fitting 71 is a female end connector. The end fitting 70 leaves an inlet port 72 for inlet of cold fluid (heavy arrows) and the end fitting 71 leaves an outlet port 73 for flow of hot fluid (light arrows).

As illustrated in the FIG. 29 to FIG. 32, a second embodiment of the invention for use with solar collectors of the heat-pipe type comprises an end fitting 15 provided with a tubular passage 18 provided with a pipe receiving portion 22 extending orthogonally to the tubular passage 18 modified for receiving the condenser 35 and the sealing plug 36 of a heat-pipe type solar collector tube 3.

Each heat tube solar tube 3 comprises an evacuated radiation transparent tube 8 enclosing a radiation absorbing plate 10 in thermal contact with an evaporator section 38 of a heat pipe 37, in thermal contact with said radiation absorbing plate 10. The evaporator section 38 is enclosed within the evacuated radiation transparent enclosure 8 to prevent heat loss. Each heat pipe solar tube 3 contains a suitable working fluid.

Each heat pipe includes a condenser section 35 at a distal end of the elongate tube 3 remote from the evaporator section 37, wherein the vaporised working fluid evaporated in the evaporator section 37 is condensed before draining back down into the evaporator section 37.

The condenser section 35 of each heat pipe tube 3 is inserted into a receiver 22 of an end fitting 15, whereby heat transfer can take place between the condenser sections 35 of the heat pipes 3 and a heat transfer fluid (e.g. water) flowing via the flow path 18 in the end-fitting 15. The end fitting 15 includes inlet and outlet openings 39, 40 on either side of the end fitting 15 to allow the heat transfer fluid in the end fitting 15 to be circulated through the chambers of adjacent tubes.

As shown schematically in FIG. 29 and FIGS. 30 to 32, the end fitting 15 includes an opening 41 to allow the condenser section 35 to enter the end fitting 15 to be immersed in the fluid contained therein. An O-ring seal 36 or similar resilient sealing means is provided around an end of the heat pipe 3 to form a fluid tight seal in said opening 41. Alternatively the condenser section 35 may be placed in thermal contact with a wall section of the end fitting 15.

The solar tubes of the heat pipe type can be mounted into protective casings and interconnected, disconnected as described above.

Various modifications and variations to the described embodiments of the inventions will be apparent to those skilled in the art without departing from the scope of the invention as defined in the appended claims. Although the invention has been described in connection with specific preferred embodiments, it should be understood that the invention as claimed should not be unduly limited to such specific embodiments.

The invention claimed is:

1. A solar collector assembly comprising
   a plurality of elongate solar collector tubes, each tube having an end fitting at one end, each elongate solar collector tube including a solar radiation absorber and a heat exchanger for transferring heat from said solar radiation absorber to a fluid to be heated, said heat exchanger including a cold fluid conduit and a hot fluid conduit, each end fitting including a fluid passageway and each end fitting having a seal to sealingly engage a fluid passageway of an adjacent end fitting, the end fitting fluid passageway being divided by a longitudinally extending dividing wall into a cold fluid passageway and a hot fluid passageway, the dividing wall having an opening through which the hot fluid conduit of the solar collector tube extends for delivery of hot fluid from the solar collector tube into the hot fluid passageway, and the cold fluid passageway of the end fitting being in fluid communication with the cold fluid conduit of the solar collector tube and wherein on assembly of one end fitting to an adjacent end fitting the dividing walls of the end fittings are substantially contiguous.

2. The solar collector assembly as claimed in claim 1 wherein the end fitting includes a groove or recess for receiving an O-ring seal.

3. The solar collector assembly as claimed in claim 1 wherein the end fitting includes a receiving portion for receiving an end of a fluid flow pipe of a solar collector tube or a condenser section of a solar collector tube.

4. The solar collector assembly as claimed in claim 3 wherein the receiving portion extends substantially orthogonally to the fluid passageway.

5. The solar collector assembly as claimed in claim 3 wherein the receiving portion is adapted for sealingly engaging with an end of a fluid flow pipe or a condenser section of a solar collector tube.

6. The solar collector assembly as claimed in claim 5 wherein the receiving portion includes a smooth face for engaging a seal or a seal for sealingly engaging with an end of a fluid flow pipe of a solar collector tube.

7. The solar collector assembly as claimed in claim 6 wherein the seal is an O-ring seal.

8. The solar collector assembly as claimed in claim 5 wherein the receiving portion is adapted for sealing engagement with a sealing plug of a condenser section of a solar collector tube.

9. The solar collector assembly as claimed in claim 1 further comprising a protective casing for receiving the end fitting and an end of the solar collector tube.

10. The solar collector assembly as claimed in claim 9 wherein the end fitting and/or the end of the solar collector tube are releasably engageable in the protective casing.

11. The solar collector assembly as claimed in claim 10 wherein the protective casing includes a main protector body and a closure part which is movably mounted to or removable from the main protector body.

12. The solar collector assembly as claimed in claim 11 wherein the protective casing includes a removable end cap.

13. The solar collector assembly as claimed in claim 11 wherein the protective casing includes a hinged or pivotal lid part.

14. The solar collector assembly as claimed in claim 9 wherein the protective casing includes a receiver for receiving a locking clip for securely mounting the solar collector tube and/or the associated end fitting in the protective housing.

15. The solar collector assembly as claimed in claim 9 wherein the protective casing includes a support structure.

16. The solar collector assembly as claimed in claim 15 wherein the support structure is integral with the protective housing.

17. The solar collector assembly as claimed in claim 15 wherein the support structures of adjacent protective casings are interlinkable.

18. The solar collector assembly as claimed in claim 17 wherein adjacent support structures are interlocked by an interlink component.

19. The solar collector assembly as claimed in claim 18 wherein at least part of the interlink component is integral with the support structure.

20. The solar collector assembly as claimed in claim 18 wherein the interlink component is separate or separable from the support structure.

21. The solar collector assembly as claimed in claim 1 wherein the end fitting comprises a pair of channels on one side of the end fitting, a circumferential inclusion on the opposite end of an adjacent end fitting, and a resilient clip which extends through the channels to secure the adjacent end fittings together.

22. The solar collector assembly as claimed in claim 1 wherein the end fitting comprise a twist lock for engagement between adjacent end fittings.

23. The solar collector assembly as claimed in claim 22 wherein the twist lock includes an inclusion at one end of an end fitting which is engagable with a protrusion at the other end of an adjacent end fitting.

24. The solar collector assembly as claimed in claim 22 wherein the twisting is through approximately 20 degrees.

25. The solar collector assembly as claimed in claim 1 wherein the end fitting includes circumferential inclusions or protrusions on opposite faces of adjacent end fittings and a clamp that engages with the circumferential inclusions or protrusions to secure adjacent end fittings together.

26. The solar collector assembly as claimed in claim 1 wherein the end fittings are formed from a temperature resistant polymeric material.

* * * * *